United States Patent [19]

Burnett

[11] 4,071,710

[45] Jan. 31, 1978

[54] COMMUNICATION-RECORDER SYSTEM

[76] Inventor: Roy Burnett, 29341 Hillrise Drive, Agoura, Calif. 91301

[21] Appl. No.: 629,034

[22] Filed: Nov. 5, 1975

[51] Int. Cl.² .......................................... H04M 9/06
[52] U.S. Cl. ............................... 179/37; 179/18 AD; 179/1 H; 179/1 CN
[58] Field of Search ................... 179/1 H, 1 HF, 1 C, 179/2 C, 81 B, 1 VC, 1 CN, 18 BC, 37-39

[56] References Cited

U.S. PATENT DOCUMENTS

| | | | |
|---|---|---|---|
| 2,883,457 | 4/1959 | Carter et al. | 179/18 AD |
| 3,024,310 | 3/1962 | Montor | 179/1 H |
| 3,126,448 | 3/1964 | Millett | 179/1 H |
| 3,219,761 | 11/1965 | Schmitthenner | 179/1 H |
| 3,278,690 | 10/1966 | Van Horn | 179/18 AD |
| 3,297,824 | 1/1967 | Montor | 179/1 H |
| 3,562,430 | 2/1971 | Faust et al. | 179/1 C |
| 3,573,375 | 4/1971 | Kinzer | 179/1 H |
| 3,740,487 | 6/1973 | Ter Veen | 179/1 H |

Primary Examiner—Kathleen H. Claffy
Assistant Examiner—Gerald L. Brigance

[57] ABSTRACT

An improved inter-communication system is disclosed wherein master stations are selectively interconnected to a plurality of shared amplifiers and are characterized by such features as: means for selectively securing and reserving an amplifier automatically in the course of making a call; locator-status indicator means adapted to indicate automatically the status condition of any one of several selected master stations (e.g. out of office) when a set is interrogated; automatic privacy means adapted to allow a called person to decide whether to respond by voice or by an alternate reply signal, and to prevent eavesdropping; a simplified, rapid means for setting up a conference; a recorder selectively connectable for one-way or two-way recording; automatic call-cancellation; single-carrier carriage of encoded status, or other signals, and the like.

8 Claims, 13 Drawing Figures

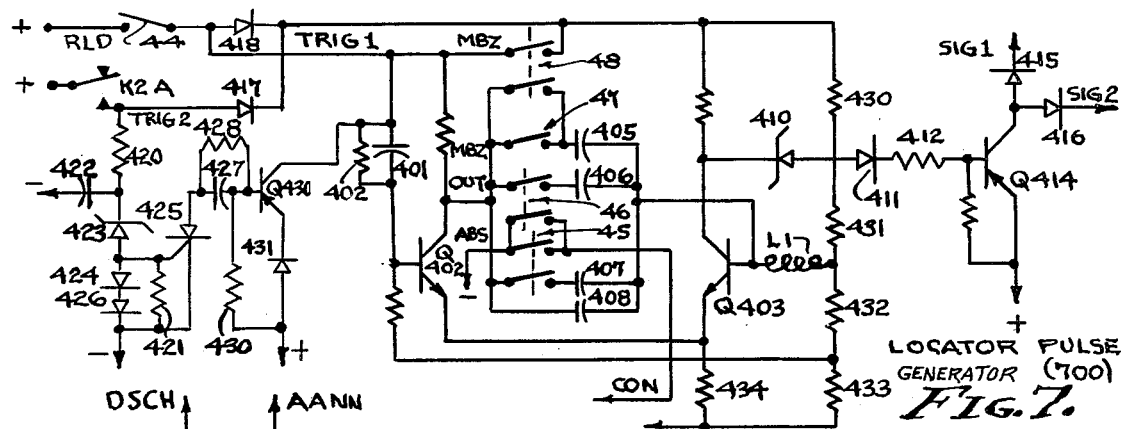
FIG. 7. LOCATOR PULSE GENERATOR (700)
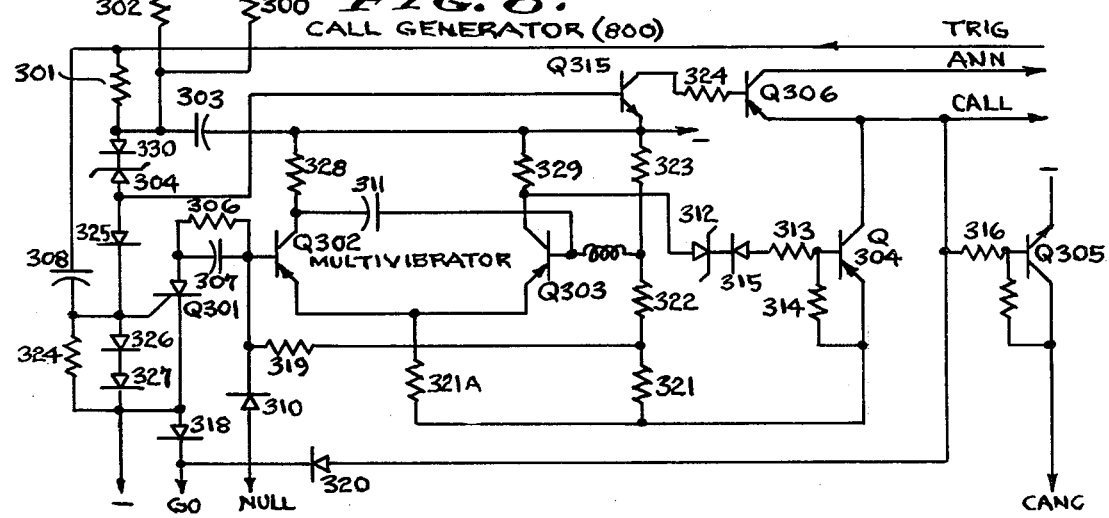
FIG. 8. CALL GENERATOR (800)
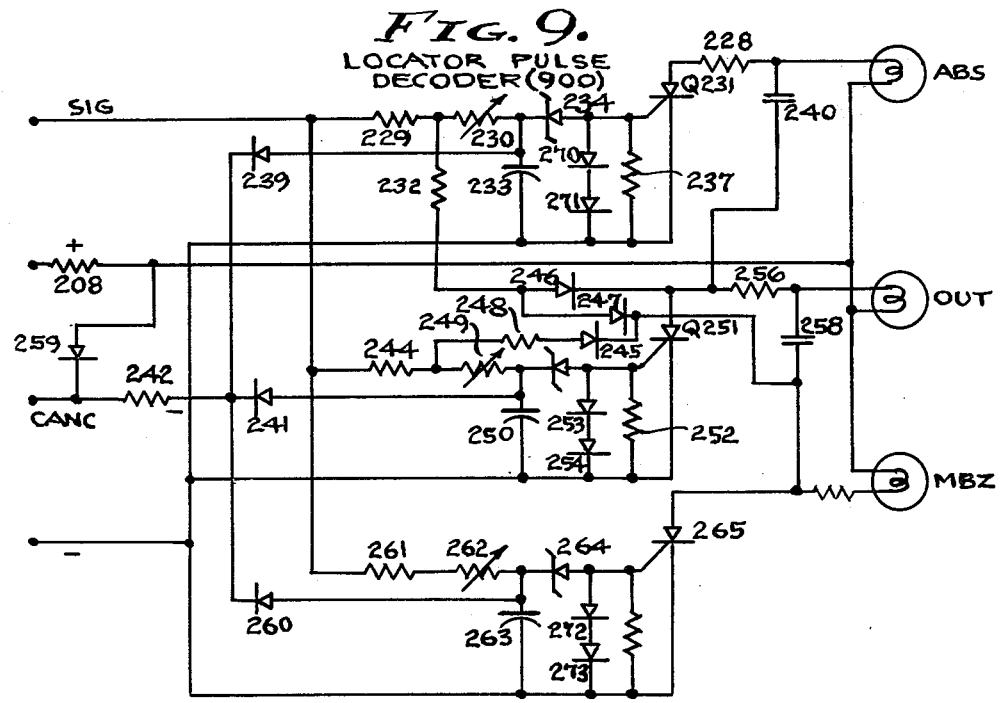
FIG. 9. LOCATOR PULSE DECODER (900)

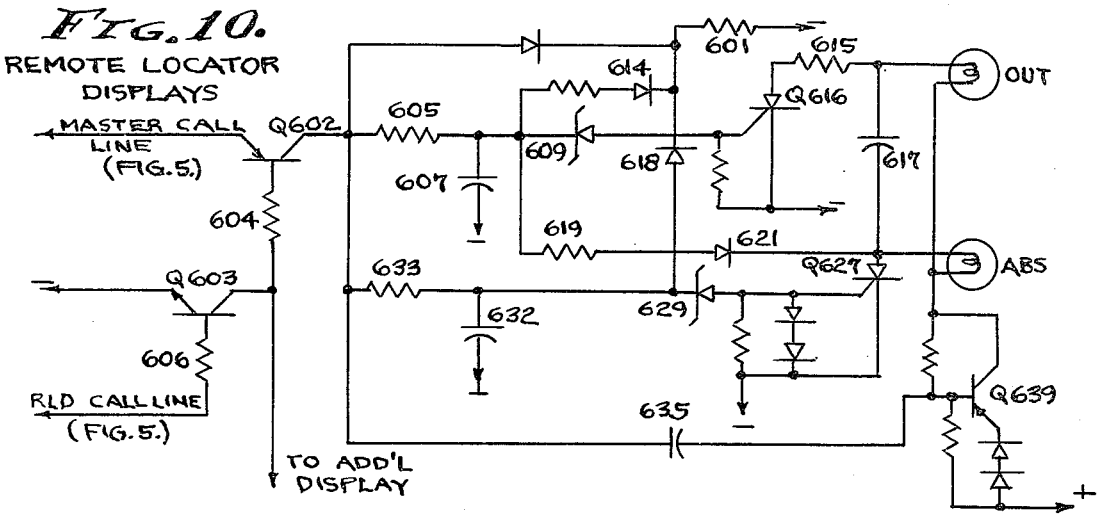
FIG. 10. REMOTE LOCATOR DISPLAYS
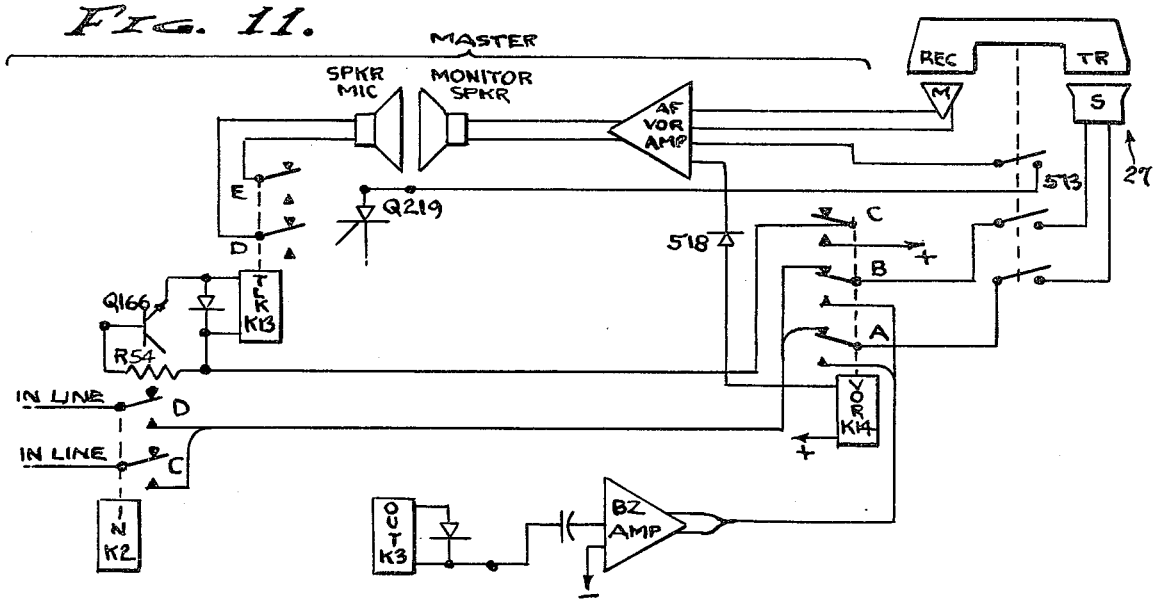
FIG. 11.
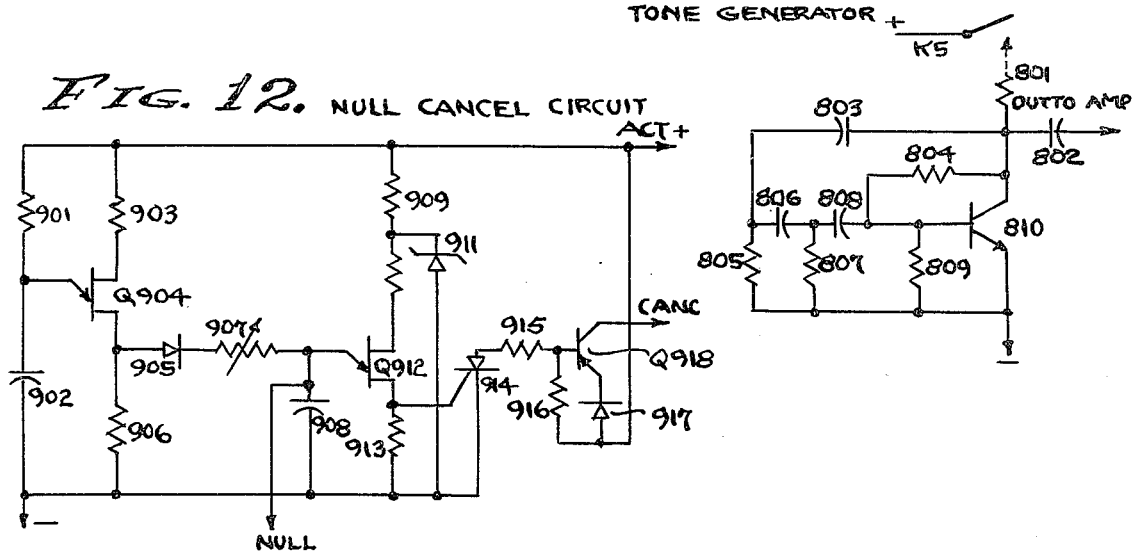
FIG. 12. NULL CANCEL CIRCUIT
FIG. 13. TONE GENERATOR

COMMUNICATION-RECORDER SYSTEM

INTRODUCTION

This invention relates to a new and improved multi-master intercom system comprising a plurality of communicating stations which can be operated selectively for talk or listen functions, by voice or alternate signals, and otherwise to intercommunicate with one another on a prescribed, improved basis; each station including such basic components as station-selecting means, speaker-microphone means, and talk-listen switching means, which, together with remote, specially allocated amplifier means can provide a new improved mode of multi-station communication.

Systems according to the present invention implement the foregoing and other features in a particularly simple, practical manner, for instance, providing the previously mentioned locator-status indicators, recorder means, and annunicate with no additional interstation wiring. Moreover, each set preferably includes an automatic tape recorder adapted to be activated automatically and operated simply via an incoming call, and means to indicate this operation.

Workers in the art of providing and/or using intercommunications systems, especially in a related complex of offices which typically require calls and conferences between two or more locations, are aware of the great interest now shown in providing such systems at reasonable cost and with greater simplicity. These systems must show considerably more versatility than is presently offered with practical equipment available today. The Communication-Recorder System of this invention provides the desired improvements with many unique features. For instance, it makes possible extremely rapid initiation of a conference, calling and identifying the conferees and signifying their readiness in a few seconds without a word being vocalized, as opposed to present-day intercommunication equipment wherein this is not possible in a practical manner.

A preferable implementation of the improved system is accomplished by providing for full, automatically programmed supervision of its use. An example of the supervisory feature is automatic cancellation. A master station cannot be left tied up and connected to another master station to prevent further reception of calls by an operator absent-mindedly forgetting to set switches, etc., as with conventional equipment. Also, the invention provides a privacy mode of operation which is invoked automatically and an easy annunciate feature which need not always be reset manually as in the prior art. The simple act of replying by voice to a call can nullify privacy when invoked and also extinguish annunciator lamps.

The present Communication-Recorder System also provides the following and other improvement features which will be recognized as needed and significantly advantageous by those skilled in the art: rapid unvoiced initiation of conferences; disablement of all unused sets during conference invitation; automatic allocation and/or reservation of one of several commonly available amplifiers; communication of status and other signals (informational or control) between master stations without additional wiring, thus enhancing the versatility and expansibility of the system; a privacy mode which may be invoked automatically and nullified automatically; integrated recorder means made available selectively and automatically, remotely initiated after an incoming cal, and other features noted below.

PRIOR ART

Present-day intercommunications systems can (or should) provide such desired features as private lines, optional privacy to protect against eavesdropping, ability to provide for conferences, and identifying annunciator lights. While such features have, to some extent been available, innovations have not evolved which were directed toward improving speed and efficiency of communications, and only minor refinements have been developed such as, for example, push-button station selection as opposed to rotary dialing. The present Communication-Recorder System is directed toward providing such necessary features while, in addition, providing further improved implementation, for intercommunicating in a more modern, efficient, practical and economical manner, and includes the following features, as compared with commonly available, comparable intercom systems:

Simple Calling

Heretofore, calling remote station has been accomplished by rotary dialing or making a station selection with multiple push-buttons (in stepping switch mode), toggle switches, locking push buttons, wafer switches. With this invention, one presses a single push-button, which is non-locking and self-restoring, and a call is automatically made to the selected station. Completion of a call is indicated automatically by light. A status reply may be received automatically from a called station, such as: "I am busy"; "I am absent"; "Call back in 15 minutes", etc., such features herefore have been unavailable with comparable prior art systems.

Automatic Cancellation

With prior art systems, if the callee (called station) is busy, the caller must restore his selectors or push-button switches, etc. With this invention the calling station remains in the stand-by condition. Likewise, if a callee, upon receiving a call, fails to reply within a reasonable time, both stations are automatically released to stand-by; a feature heretofore unavailable. After a communication is completed on present-day equipment, one or both users must release their sets manually in order to place the equipment in stand-by. Otherwise the lines may be tied-up indefinitely. With the present invention, release to stand-by is provided automatically, both as to a calling station and to those in communication with it when other users forget to cancel to stand-by.

Privacy

Some conventional intercom sets have provided for privacy from eavesdropping simply via a warning call tone to announce an incoming call and/or making it necessary for the called person to hold down his "TALK" switch while replying. The caller can talk to the called person only by actuating the "TALK" switch and must return it to listen for each reply. With the present system, privacy is invoked in an improved manner. A call tone announces regular calls, and the privacy mode is nullified automatically by a momentary closure of the "TALK" switch or by a VOR (voice operated relay). Privacy is automatically restored once the communication is terminated; a needed feature heretofore unavailable. This invention prevents a called person, for example, during a telephone call, from being interrupted by a voiced call. When one nullifies privacy, one has the advantage of hands-free reply without being required to restore privacy manually at the end of the communication.

Call Annunciation

As workers in the art well know, users typically try to minimize the cost of installing an intercom system. Thus, if a user later develops a desire for the annunciation feature, it is seldom added because of the excessive added cost (e.g. up to 50% of the total system cost) for materials, labor, and modification of masters, junction boxes and cables; with the present invention only quick, simple, inexpensive addition of plug-in modules at the stations-to-be-modified is necessary. With the present invention, annunciation is achieved by a station selector switch held longer during regular calls. Call annunciation occurs automatically during conference invitation and acknowledgement. ANNUNCIATOR lights are extinguished automatically on conference implementation. If ABS or OUT is actuated at the non-acknowledged master only the selector of the conference caller is illuminated. It and any previously illuminated selectors remain on upon conference implementation.

Conference Mode

The speed, simplicity and lack of "talk" characterizing the calling of a conference with this invention will be recognized as a highly desirable feature by those knowledgeable in the art. Most intercom (or like amplified-voice) systems which provide a conference feature are so complex to set up that they are rarely used. Some prior-art systems have provided only for calling a conference with a constant reference group, and are not flexible enough to allow varying the group. By contrast, this invention allows one to call a number of parties from any station simply by actuating the conference switch and appropriate station selectors. The caller thus is identified automatically by an annunciator lamp and appropriate buzz to the selected callees. The conference can begin in but a few seconds and without a word passing.

Automatic Remote Control/Indication

Further, unlike present-day systems, in this invention a conference invitee automatically indicates his unavailability by having, previous to the call, actuated the proper locator switch. Upon conference implementation his master is enabled either to cancel to standby or silently to record the conference as the conference caller desires. Also, lamps are illuminated automatically to indicate the conference invitation and the recorder actuation.

No Interruption

Another novel feature of the system provides anti-interruption means to prevent more than one person from speaking at the same time during a conference. In conventional amplified voice systems this typically results in disastrous distortion and renders the system inoperative during conference communications.

Conference Termination

Conference termination is effected very quickly and easily. Any conferee may cancel all conferee masters to stand-by. Alternatively, following a predetermined period of no conversation, cancellation occurs automatically for all conference connected masters. This protects against users forgetting to cancel.

Tape Recorder

A tape recording facility is so integrated with each master station of the system of this invention that a person initiating a regular call can, as soon as he speaks, automatically activate the tape recorder in a remote called station if the station has been so enabled. Thus, messages and information can be recorded for future reference if the callee is away or unable to respond, as opposed to present day intercom systems where recorders operable in this mode are not practically available (although recorders have been integrated with telephone systems).

General

In general, switching is performed by automatic relays and/or solid state devices. Also, a great many features and operations heretofore performed manually are now automated, leading to greatly enhanced speed and efficiency of intercommunication.

Operational Indicator Lamps

For the first time in an office intercommunication system complete visual indication of all operational functions in progress is provided for incoming calls, outgoing calls, recorder status, availability of amplifier, conference, etc.

Status Indicators

The problem of how to communicate with the unresponsive callee is a perplexing one, and has led to waste of time and expense, whereas this invention resolves it with locator switches and corresponding indicator lamps. More particularly, such locator-status switches are provided to be engaged selectively at any master, so that when the master is interrogated, a comparable, associated locator-status lamp will be lit on the calling master, indicating automatically which status switch has been engaged at the called set to provide the desired information to the caller. The caller receives a quick information response and can take appropriate action quickly, such as leaving a recorded message, initiating a page, activating a remote recorder, or initiating his annunciator light at the receiving set to serve as a call reminder. Of course, such a locator-status indication might be provided in some other form, but when implemented according to state-of-the-art techniques would likely be too expensive and cumbersome for all but the exceptional system. By contrast here, the locator implementation requires no extra cabling or junction box adjustment. The same economies apply for annunciator lights and the recorder signals.

Remote Locator Display

Information can be displayed by light at a remote location by the simple operation of pressing a switch associated with the Remote Locator Display.

Objects

In view of the foregoing, it is an object of this invention to resolve the aforementioned difficulties and to provide advantageous features in a novel, improved intercommunications system such as the "COMMUNICATION-RECORDER SYSTEM" described herein.

A further object is to provide such a system including an improved calling arrangement, especially as implemented with callee-status switches, and preferably also with operational indicators signaling completed incoming and outgoing calls. A related feature is to provide such a system and calling arrangement for a plurality of intercom masters served by a plurality of common amplifiers adapted to be reserved automatically and selectively for use in a given multi-party dialogue, and conditionally secured by the mere act of calling. Yet another related feature is to provide such an arrangement where intercom dialogue is carried out by a simple switch manipulation which effectively reverses the parties' input-output connections of the parties' master stations to such a secured amplifier.

Another object is to provide such a Communication-Recorder System including a privacy mode in which the user can place his set in a state, whereby a call and its associated signals can be received normally, yet with no incoming or outgoing vocalized signals from the master until this privacy mode is nullified, thus preventing call interruptions and/or eavesdropping. Upon nullifying privacy, the caller can talk and listen to the callee normally, nullification being effected selectively either with a switch or a VOR (voice operated relay) action.

Yet another object is to provide such a Communication-Recorder System with an improved array of indicators for indicating (i.e., annunciate) all functional operations, the callee-status and a caller's identity preferably with no added cabling; especially where such functional indicators continually provide visual indication of all important operations, such as calling-out, calling-in, privacy, conference mode, record, etc., especially where such callee-status indicators comprise a plurality of prescribed status switches to indicate busy, absent, out, etc., at each master, together with an associated corresponding array of locator status lamps which, upon interrogation of a master, can provide instant feedback to a caller's locator lamps as to the condition of such locator switches to provide a silent, unvocalized, pre-selected call reply, this feature preferably being provided without additional wiring and by means of pulse-encoding/decoding means operating through the voice lines of the Communication-Recorder System and being initiated by the simple act of placing a call.

A particularly related object is to provide such a system including an annunciate feature to indicated a caller's identity instantly to the callee, without additional cabling, which may be effected simply by pressing the station selector switch for a longer period; especially where the annunciation may be cancelled automatically, and especially where such annunciation indicators are adapted to persist as a call reminder.

Yet another object is to provide such an improved Communication-Recorder System with a more effective, versatile conference mode, through which a multi-party conference may be called and acknowledged, and the conferee's identities established by the momentary operations of a switch, without need for voice communication—preferably implemented to include the mentioned annunciation feature and a "CONFER" signal; particularly where invitation to conference mode acts temporarily to prevent other masters from calling, to reserve an amplifier for use and freezing the status of all others, automatically releasing them once the conference begins; and especially wherein any conferee can depress a switch momentarily to cancel all conferring masters, or, when this occurs automatically to avoid tied-up lines; and further including an automatic cancellation feature whereby if a call is not acknowledged, the callee master is automatically released to stand-by (after a prescribed delay to allow for reception of a recorder actuation pulse) and whereby automatic release is also invoked after a communication has ceased, and also whereby a conference mode may be invoked with one or several stations automatically placed in tape recording condition; and whereby conversation priorities are automatically set and interruption prevented and signaled.

Yet a further object is to provide such a Communication-Recorder System including integrated tape recorder means, requiring no additional wiring and automatically controlled in the course of placing a call, especially where a nonresponsive callee may provide for automatic activation of his recorder and an associated reminder light, and whereby a recorder out of tape or not in record position will cancel such a call attempt automatically, so as to indicate this condition to the caller and/or indicate this condition by locator status means.

A still further object is to include one or more persons on outside telephones in a conference with a plurality of masters. The telephone handset is placed upon a coupling network provided therefor connected to a master, as will be described. The telephone party is then heard by all masters, and vice versa. Further, the telephone party will receive a warning buzz if he attempts to interrupt any person speaking, and vice versa.

An even further object is to provide a Communication-Recorder System implemented by improved non-locking momentary-contact type switches (e.g. for station selection) so as to enable more rapid, efficient and reliable communication, and whereby the system is implemented so as to provide for addition of features and functions by plug-in means with no additional cabling connections, using signal encoding means, etc.; and whereby implementation is via a minimum of modular components which are reliable, repairable and expandable.

DRAWINGS

The various objects and features of this invention will be more fully understood from the following detailed description of a preferred embodiment showing an application thereof, taken together with the accompanying drawings, in which.

Figure 3:
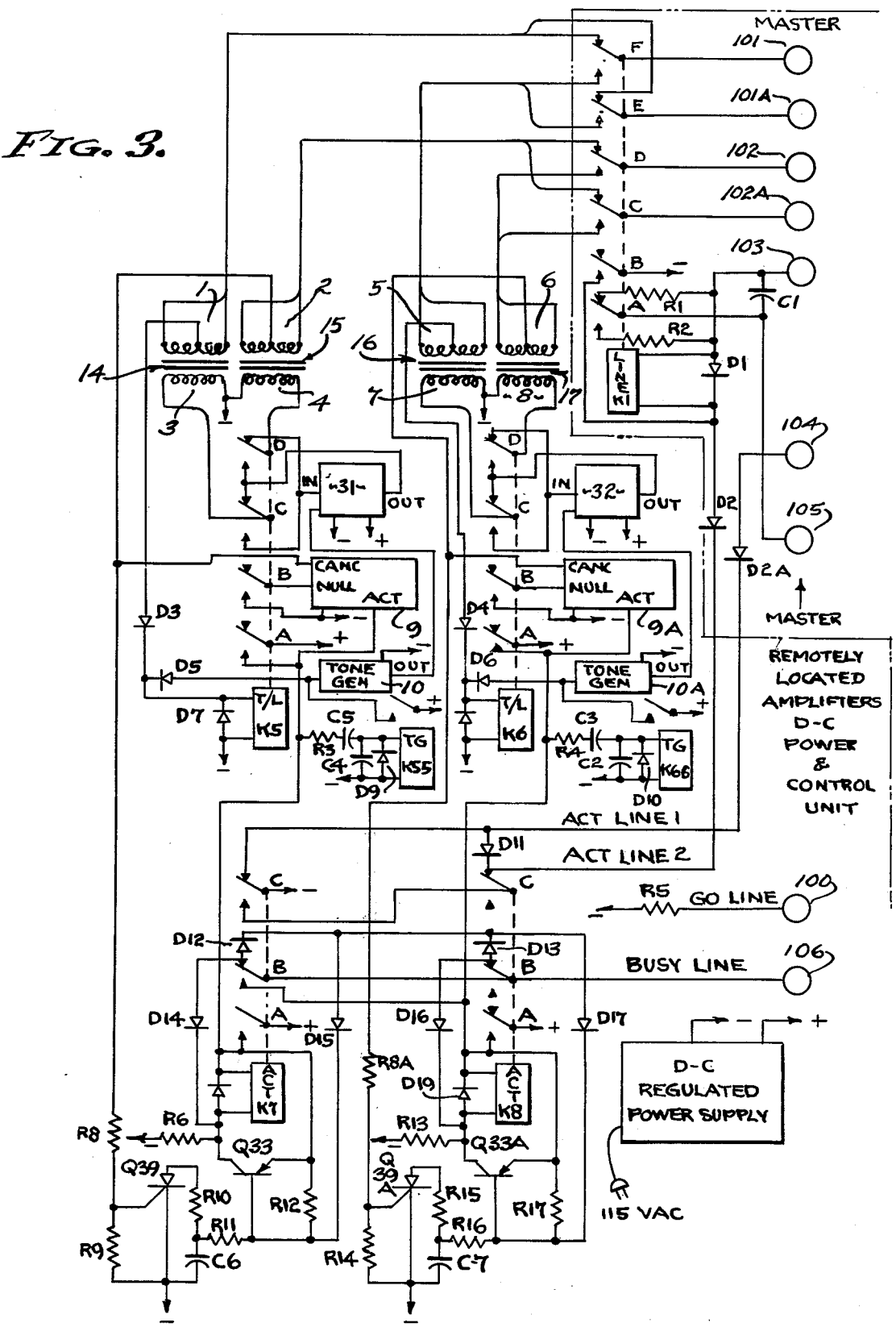
FIG. 3 is a schematic and block diagram of two remotely located amplifier means, the power supply, and control elements of the amplifiers.
Figure 4:
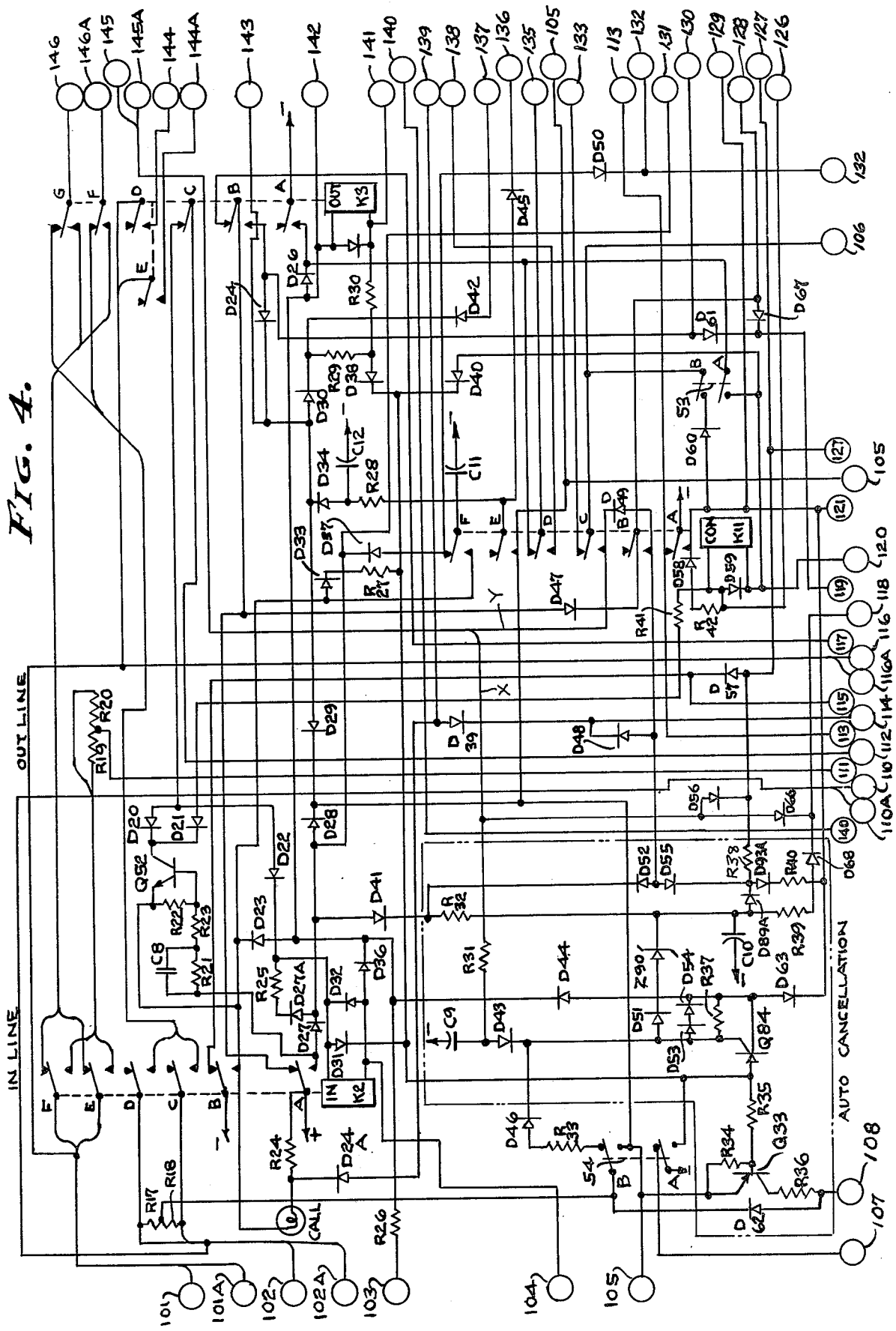
Figure 5:
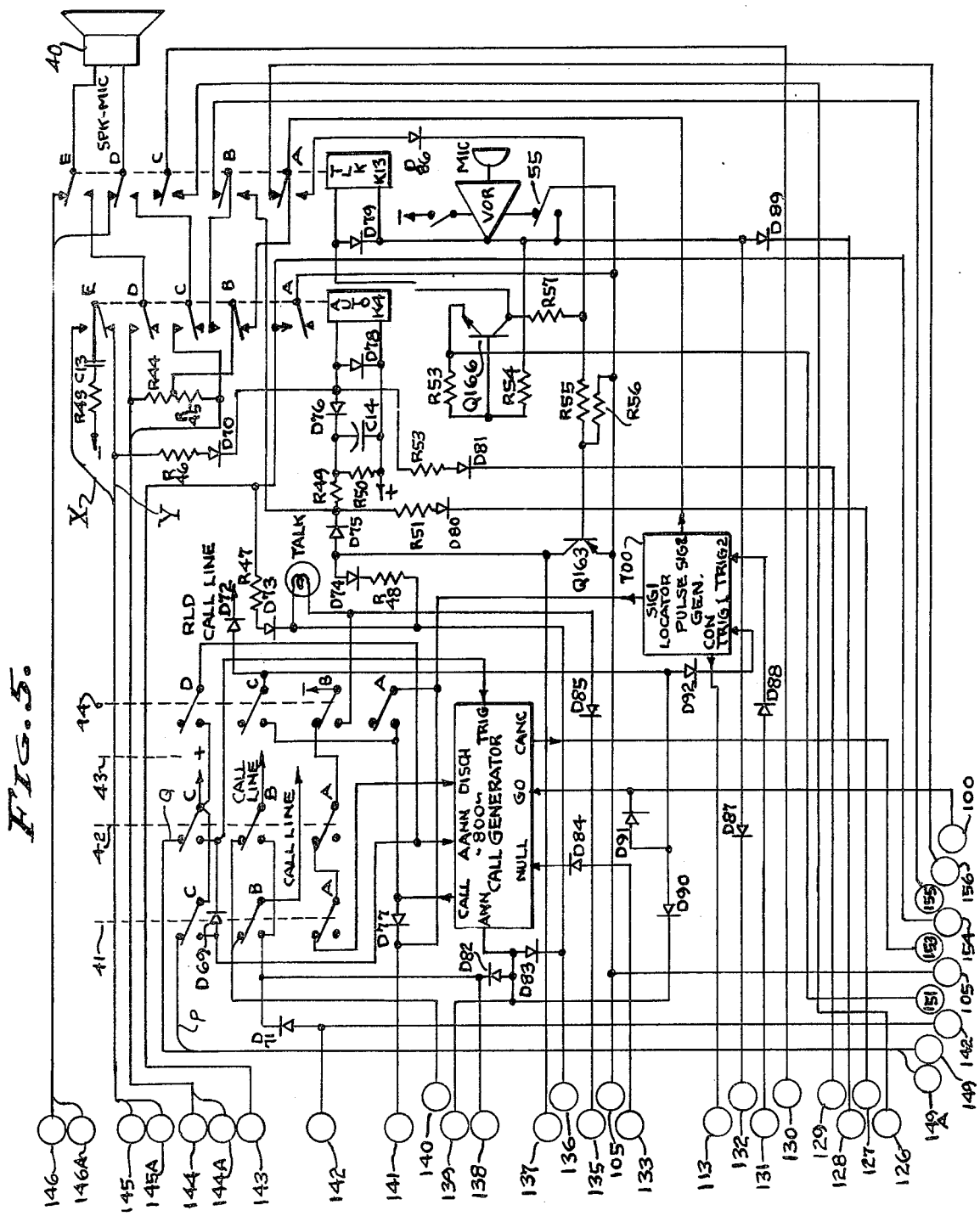
Figure 6:
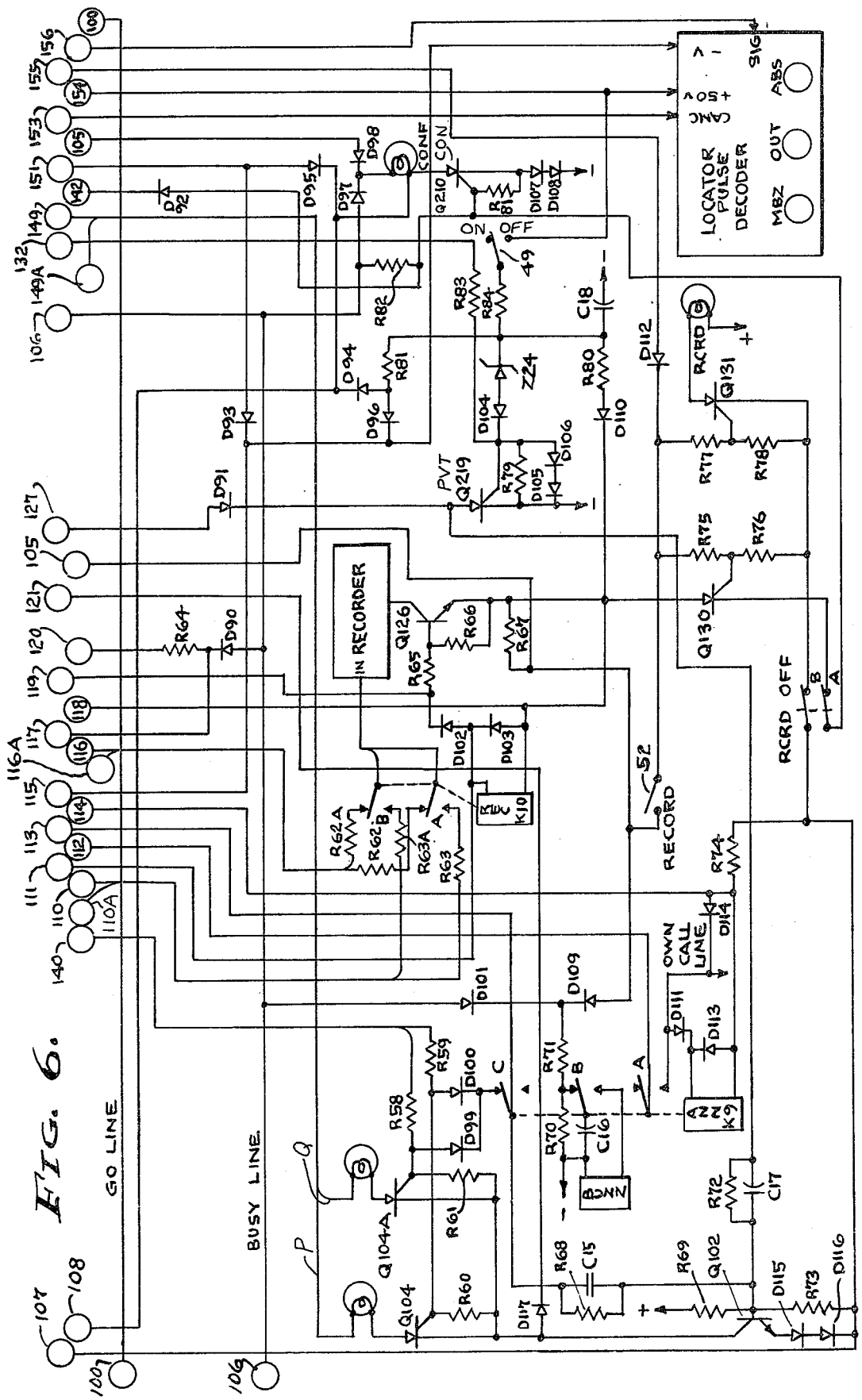

FIGS. 4, 5, and 6 are schematic and block diagrams illustrating the circuits of a master, FIGS. 3 through 6 being connectable to each other by the encircled numbered terminals as indicated.

Figure 1:
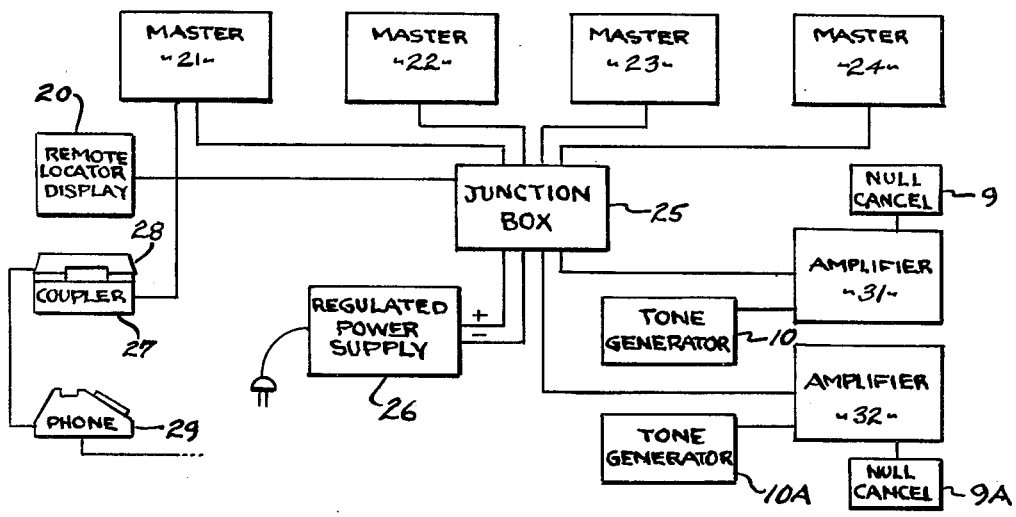
FIG. 1 is a schematic block diagram of the Communication-Recorder System, showing a plurality of masters and associated devices sharing a plurality of amplifiers and a power supply therefor.

FIG. 7 is a detailed circuit schematic diagram of a locator pulse generator part of the invention shown generally in FIG. 5;

FIG. 8 is a detailed circuit schematic diagram of a call generator part of the invention shown generally in FIG. 5;

FIG. 9 is a detailed circuit schematic diagram of a locator pulse decorder part of the invention as shown generally in FIG. 6;

FIG. 10 is a detailed diagram of the remote locator display shown generally in FIG. 1; and FIG. 11 is a detailed diagram of the telephone modification as shown generally in FIG. 1;

FIG. 12 is a circuit diagram of a typical null-cancel circuit used in the invention; and FIG. 13 is a circuit diagram of a typical tone generator circuit used in the invention.

DESCRIPTION OF THE PREFERRED EMBODIMENT

Referring now to FIG. 1 in which a block diagram of an embodiment of the Communication-Recorder system according to this invention is shown, it can be seen that a plurality of intercommunication master units or stations 21 – 24 may be interconnected with any one of a plurality of remotely located amplifier units 31, 32 through a junction box 25. A regulated power supply 26 remotely located with the amplifiers supplies power to the masters 21 – 24 and amplifiers 31, 32 as well as to other devices in the system as hereinafter described. Although there are only four masters shown along with two amplifiers, it should be clear that more master stations and amplifiers are practical in a particular system if needed. Two masters in communication employ one common amplifier. The calling master is connected to the output of the amplifier when listening to and to the input of the amplifier when it is talking to the other master. This is accomplished by means of a talk-listen relay K5 or K6 at the amplifier. When two master stations are connected with one another they require an amplifier. When voice signals are outgoing from a master, the receiving station is then connected to the output of the selected amplifier. If an amplifier is in use between two stations, another becomes available to the others.

A remote locator display 20 is also supplied via the junction box 25 with appropriate signals and power, as hereinafter more fully described. The remote locator display is positioned remotely from the units of the system such as at a private branch exchange telephone operator's position as an adjunct to the telephone switchboard. It may also be located at some readily visible place in a large plant so that it may be seen from some distance.

One of the master stations 21 is shown in FIG. 1 connected with a telephone pickup or coupler unit 27 on which is placed a telephone handset 28. Handset 28 is connected with a commercial utility telephone 29. The coupler or pickup unit 27 may be any one of a number of known devices for direct induction or acoustic coupling to the telephone unit. It may include combinations of a known electrical, acoustical or induction coupling means as needed. The coupling unit 27 interconnects the telephone and the system of this invention for participation of a telephone caller or callee in any communications using the new system.

The power supply 26 may operate at any voltage or voltages necessary for powering the amplifiers, relays, transistors, and other devices employed in the system. It has been found that 50 volts is suitable in embodiments constructed by the inventor.

Figure 2:
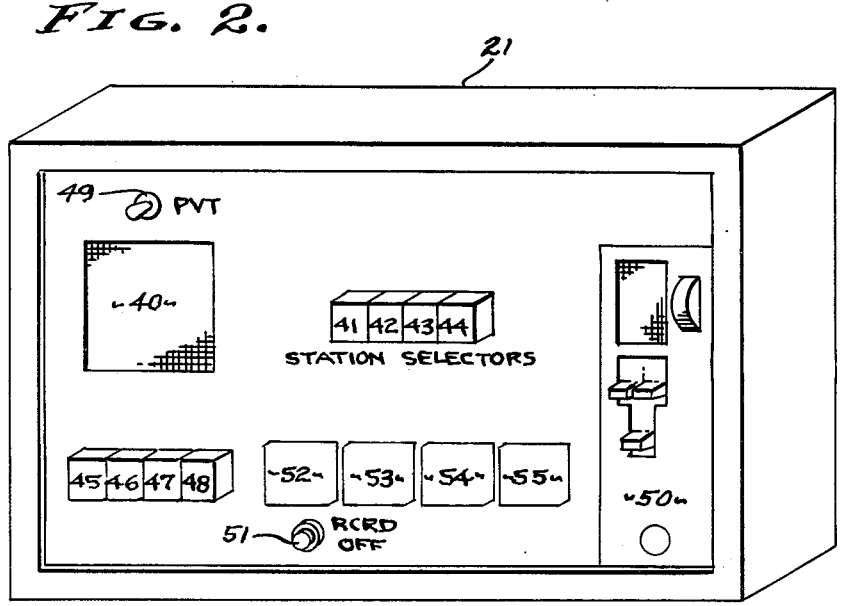
FIG. 2 is a perspective view illustrating a physical embodiment of a master, or station module according to the invention.

In each master station 21-24 as shown in the block diagram of FIG. 1 and in the panel view thereof in FIG. 2, or in each of any other master units in the system, there is included at least a speaker-microphone 40, at least a set of selector push-button switches 41-44, at least a set of locator status switches 45 - 48, a privacy on-off switch 49, a recorder 50, recorder control switch 51, and push-button switches 52-55 to indicate and control recorder status, conference status, call-cancel, and talk functions, and a number of relays and SCR's, and status of the SCR's, etc.

The circuit interconnections among the above listed components are shown in FIGS. 3-6. The block and schematic circuit diagram of FIG. 3 shows two amplifiers 31, 32. Either amplifier 31 or 32 may be connected between 2 or more masters (FIGS. 4–6) via terminals 100–106 which match corresponding terminals in FIGS. 4 and 6. Terminals 105–108, 110–121 and 127, 132 and 140 interconnect FIG. 4 with FIG. 6. Terminals 100, 105, 113, 126–133, 135, 142, 149, 149A, 151, 153–156 interconnect FIGS. 6 and 5. Terminals 105, 113, 126–133, 135 through 146A interconnect FIGS. 4 and 5. Line 113 passes through FIG. 4 from FIG. 5 to FIG. 6. Line 100 (Go line) passes through FIG. 6 to FIG. 5. Line 105 passes into several of the figures, as do lines 140 and 106.

In each master station there is a locator pulse generator 700, shown in circuit detail in FIG. 7, a call generator 800, shown in FIG. 8, in circuit detail, and a locator pulse decoder 900 shown in circuit detail in FIG. 9. Each master also has relays K1 through K4 and K9 through K13 which control the various switching functions for communication and for the indicators of the master. Relays K5 K55, K6, K66, K7 and K8 are in the remotely-located, amplifier-power supply assembly. The relays are also identified in the drawings in accordance with their respective functions as for example K2 IN, K3 OUT, or K13 TLK. The relays throughout the drawings except for K4 are shown in their deenergized condition. This is the "standby" condition of the master station. Each relay has multiple double throw contact assemblies identified by the letters A through G, as appropriate, starting with the contact assembly closest to the relay coil.

If master 21 and master 22 are connected together for communication, for example, there will be an interconnecting cable through junction box 25 between them with a plurality of wires. Each master has a cable to the junction box 25.

The remotely located amplifier 31, 32 and power supply 26 and their associated components of the communications recorder system are illustrated in FIG. 3. Also included in FIG. 3 is line relay K1 shown in its deenergized condition. A relay such as K1 is a part of each master station.

The remotely located amplifiers 31 and 32 in FIG. 3 include respective pairs of identical transformers 14, 15 and 16, 17 and talk/listen (T/L) relays K5 and K6 to provide for switching of the connections of the input and output of amplifiers 31 or 32 to the transformers 14, 15 or 16, 17 for talk/listen operation. The transformers 14, 15 for amplifier 31 and transformers 16, 17 for amplifier 32 can be used interchangeably as input or output transformers since they are identical. In the "standby" mode, amplifier 31, for example, is connected through contacts D of deenergized talk/listen relay K5 to transformer 15 operated as an input transformer and through contacts C of relay K5 to transformer 14 operated as an output transformer. When talk-listen (T/L) relay K5 is energized, these transformers reverse their functions. Contacts B of relay K5, when it is energized, places a negative voltage on the NULL circuit of null-cancel circuit 9. When a communication is effected, a pulse from the locator pulse generator 700 of the called master closes relay K5 which latches relay K7. Positive supply voltage is applied by relay K7 to circuit 9. Contacts A of ACT relay K7 apply positive voltage to the ACT terminal of null-cancel circuit 9. Relay K5 is energized when talk switch 55 is depressed and relay K1 is deenergized. Relay K6 is energized when talk switch 55 is depressed and relay K1 is energized. FIG. 3 includes the line relay K1 which is part of each master unit. All of the other components shown in FIG. 3 are part of the remotely located amplifier and power supply assembly. In the remotely located power supply and amplifier assembly are included amplifiers 31 and 32, either of which may be selected for communication. Relay K-1 is normally deenergized in standby. As shown in FIG. 3, the output line of amplifier 31 is connected to OUT lines 101 and 101A through primary 3 and secondary 1 of the transformer 14 used as an output transformer and contacts E and F of relay K-1. Talk/listen (T/L) relay K-5 is also deenergized to make the amplifier 31 output connections through contacts C of relay K-5. Contacts D of deenergized relay K-5 connect the input of amplifier 31 to in lines 102, 102A through secondary 4 and primary 2 of transformer 15 used as an input transformer. Input voice signals on IN lines 102, 102A arrive at the input of amplifier 31 via contacts C and D of OUT relay K-1. Similarly OUT lines 101/101A carry signals from the amplifier 31 or 32 whichever is in use to the speaker-microphone system of the masters using the amplifiers. The details of the operation of ACT relays K-7 and K-8 are further described below.

Referring to the LOCATOR PULSE GENERATOR 700 shown generally in FIG. 5 and detailed in FIG. 7, the circuitry involved is the transistors Q402 and Q403 and their associated circuits comprising a monostable multivibrator, Q402 normally being "off" and Q403 "on". When a negative pulse is placed on the base of Q402, it conducts and discharges capacitor 408 driving Q403 into non-conduction, the cycle being determined by the capacitor 408 and additive capacitors 405, 406 and 407 which can be switched into parallel therewith by operation of LOCATOR locking type switches 45, 46, 47, or the non-locking, duplicate MBZ switch 48.

Closure of RLD switch 44 connects +50V present at CALL of the CALL GENERATOR to the normally "off" Q430; it conducts to place a negative pulse on the base of Q402 which goes into conduction to cut off Q403. Cut off time is determined by capacitor 408 and any in parallel with it.

When a master receives a call, its latched relay K2A contacts connecting TRIG2, supplies +50V to the 0.2 second time delay circuit comprised of resistor 420, capacitor 422 and zener diode 423 causing Q425 to trigger and place a negative pulse on the base of Q402 through capacitor 427.

While Q403 is cut off, the voltage across zener diode 410 exceeds its zener point and breaks down causing current flow through resistors 409, 412, and 413 which forward biases normally cut off transistor Q414 to place +50V on diodes 415 and 416.

CON connects to the A contacts of relay K11. When OUT or ABS switches 46 or 45 are actuated, minus voltage is placed on the upper contact A of relay K11 so that if this master is called for conference the cut off bias on the annunciator SCR's at relay K9 C contacts will be removed only when it receives the call, but not for conference calls to others or conference call acknowledgements. This permits only the annunciator lamp of the conference caller to illuminate and remain illuminated when conference calling occurs when OUT or ABS are actuated.

FIG. 8 is a circuit diagram of the CALL GENERATOR shown in block 800 in FIG. 5. It consists of a pair of PNP transistors Q302 and Q303 wired in a monostable (one-shot) multivibrator configuration. The base of transistor Q302 is coupled through a parallel connected resistor and capacitor 306, 307 to the anode of an SCR Q301. The base of transistor Q302 is also connected through diode 310 to NULL. The cathode of SCR301 is connected to the GO LINE at GO for its negative (−) supply. The gate of SCR301 also connects through diode 325, Zener diode 304, diode 330 and resistor 301 to the CALL GENERATOR TRIG terminal. Also, from the junction of anode of diode 330 and resistor 301 a connection is made through a resistor 302 to DSCH (discharge) and through resistor 300 to AANN.

The collector of transistor Q303 in the CALL GENERATOR connects through Zener diode 312, diode 315 and resistor 313 to the base of PNP transistor Q304. The emitters of transistors Q304, Q303 and Q302 are connected in common with +50V TRIG connects to the positive (+) supply though switch 41, 42 C contacts. (FIG. 5) when they are closed.

Referring now to the CALL GENERATOR 800 shown generally in FIG. 5 and in detail in FIG. 8, the circuits involved are as follows:

A CALL connection to the actuating coil of relay K3; An AANN (automatic annunciate) connection from contacts C of selector switch 41; a DSCH connection from contacts A of station selector switch 41; a TRIG (trigger) connection from contacts C of selector switches 41 and 42 through D69, a "CANC" (cancel) connection to resistors 232 and 208 at the "LOCATOR PULSE DECODER"; a "GO" connection to a resistor R5 (FIG. 3); a "NULL" connection to the "BUSY LINE" through contacts C of relay K11; and an "ANN"](ANNUNCIATE) connection to diode D39 and as shown.

When a station selector switch 42, etc., is closed momentarily to make a regular call, +50 v is impressed through its C contacts and through TRIG upon capacitor 308 (FIG. 8) and to the gate of SCR Q301 which fires to place a minus voltage on the base of transistor Q302. The transistors Q302 and Q303 and their associated circuit components comprise a monostable multivibrator, transistor Q303 being normally conducting and transistor Q302 being off. A brief pulse from SCR Q301 causes transistor Q302 to conduct and place a positive potential on the base of transistor Q303 causing it to cut off. The cut off time is determined mainly by capacitor 311. While transistor Q303 is cut off, a minus voltage connects through a resistor 329 to the anode of Zener diode 312. Positive potential on the cathode of Zener diode 312 connects through resistors 313 and 314, the series of resistors being chosen so that more than 27 v appears across 27V Zener diode 312 causing it to break down and conduct so as to place a forward bias on transistor Q304. The result is a positive pulse of a width determined by the pulse from transistor Q303 appearing as the call pulse through the "CALL" connection to the coil of calling master relay K3. The positive pulse on the collector of transistor Q304 is coupled through resistor 316 to the base of transistor Q305 causing it to conduct and to send a negative pulse through the "CANC" connection to the "LOCATOR PULSE DECODER" 900 so as to extinguish its lamps and to discharge its timing capacitors 233, 250, 263. The positive pulse on the collector of transistor Q304 also connects to the "GO LINE" (100) terminating at resistor R5 (see FIG. 3). Because the "GO LINE" is now positive, calls cannot be originated at any other master because minus voltage is not being furnished from the "GO LINE" to its SCR Q301.

An annunciator call results when a station selector switch such as 42 is depressed for a duration of 0.5 second. A call pulse appears immediately at CALL as just described. Then it takes approximately 0.5 second for the +50 v applied through resistor 301 to charge capacitor 303 to the Zener voltage of Zener diode 304 which upon breakdown triggers SCR Q301 and forward biases transistors Q315 and Q306 to result in a call pulse at the "ANN" connection through diode 82 to the B contacts of the selector switch such as 42 for connecting to other master call lines, and also connecting through conductors 139, 114 and diode D39 to the "OWN CALL LINE". Further noting the connections from contacts B of switch 42 when closed to connection "ANN" of the call generator 800 it places +50 v on connection "AANN" of call generator 800 which has a low value resistor 300 compared with resistor 302. This instantaneously charges capacitor 303 to the Zener voltage of Zener diode 304 which places a forward bias on transistor Q315 resulting in a +50 v pulse at the "ANN"]connection coincident with one on "CALL"; a modification that permits an annunciator call to result from momentary contact of a selector switch so arrranged.

Referring now to the "LOCATOR PULSE DECODER" shown as a block 900 in FIG. 6 and detailed in FIG. 9, the circuit involved is as described below. As shown generally, this portion of the master involves a display of lamps to indicate "MBZ" (am busy), "OUT" (out of office) and "ABS"(absent), and responsive to a signal connection, and a cancel connection. Locator pulses at +50 v from the "LOCATOR PULSE GENERATOR" at the called master are received at the calling master's "LOCATOR PULSE DECODER"900 by three resistors 229, 244 and 261 of the same values, and each of which is connected to a variable resistor 230, 249, and 262 in series with a capacitor 233, 250, and 263 which form time delay circuits, respectively. The time delay is dependent upon the series resistance, the capacitance and the Zener voltages of the Zener diodes 234, 275, and 264 connected respectively to the gates of the SCR's 231, 251, and 265 which illuminate their associated locator lamps respectively. For example, the "ABS" lamp is triggered on in 0.2 second, the "OUT" lamp in 0.3 second, and the "MBZ" lamp in 0.4 second. When a locator pulse triggers the "ABS" SCR 238 and persists for 0.3 second, SCR 251 is triggered and causes the "OUT" lamp to be illuminated, in which case the minus voltage from SCR 251 placed upon capacitor 240 chokes off SCR 231 thereby extinguishing the "ABS" lamp. In order to keep SCR 231 from retriggering, the minus voltage connects through diode 246, resistor 232 and to resistor 229, the values of which are chosen so that at their junction the positive voltage will be less than the Zener voltage of diode 234 when a +50v Locator pulse is being applied to resistor 229. When the locator pulse which caused illumination of the "OUT" lamp persists through 0.4 second, the SCR 265 will trigger and cause the "MBZ" lamp to illuminate, in which case the minus voltage from SCR 265, placed uponcapacitor 258, chokes off SCR Q251 thereby extinguishing the "OUT" lamp. In order to keep SCR 152 from re-triggering, the negative voltage is applied through diode 245 and resistor 248 to the junction of resistors 244 and 249, to prevent SCR Q231 from re-triggering the negative (−) voltage is applied through diode 246 and resistor 232 as before.

The negative voltage return for the "LOCATOR PULSE DECODER" (LPD) is applied through the contacts B of relay K2 in its deenergized state (leads 115, FIGS. 4 and 6) and is available to a calling master but not to a called master, because relay K2 in the called master is energized at that time. The +50v supply is applied to the locator pulse decoder 900 through resistor 208 and diode D24 (FIG. 4) via contacts B of energized relay K3. When a calling master is cancelled, +50v for the locator lamps is cut off to extinguish them.

Before each call is made, capacitors 233, 250, and 263 must be discharged. During conference calling the lamps of the "LOCATOR PULSE DECODER" must also be extinguished before each call. Because relay K3 is not deenergized, the lamps are extinguished during conference calling by a negative voltage pulse from the "CANC" connection of the "CALL GENERATO" 800 (via leads 153, FIGS. 5 and 6) through resistor 242 and diodes 239, 241 and 260 so as to discharge capacitos 233, 250, and 263. The negative pulse from the "CANC" connection is also applied through diode 259 to the junction of resistor 208 and locator lamp return line which chokes off the +50v supply thereby causing the associated Q231, Q251 and Q265 SCR's to become non-conductive, extinguishing the lamps.

The "REMOTE LOCATOR DISPLAY" (RLO) is shown as a block 20 in FIG. 1 and in circuit detail in FIG. 10. It is associated with portions of a master. The calling master is connected to the RLD by the call line over which the master applies pulses to the RLD through resistor 606. As shown in FIG. 10, the display involves an "OUT" lamp and an "ABS" (absent) lamp. Closure of switch 44 assigned to REMOTE LOCATOR DISPLAY (RLD) applies +50V through D contacts to AANN of CALL GENERATOR; call pulse to CALL connects through switch 44 C contacts to TRIG1 of LOCATOR PULSE GENERATOR (LPG); locator pulse at SIG1 connects through switch 44 C contacts to the RLD call line connecting to resistor 606 in the base circuit of Q603 whose emitter receives +50V from the LPG through Diode 90, conductors 139 and 114 and the master's OWN CALL LINE. +50V through Diode 91 connects to the GO LINE and prevents any other master from calling at this time. +50V from the forward biased transistos Q603 and Q602 in the RLD choke off capacitor discharge (−) voltage through resistor 601 and charge capacitors 607 and 632 through resistors 605 and 633 respectively. A longer pulse is required to illuminate the "ABS" lamp. A negative voltage on the anode of SCR Q627 is momentarily applied through capacitor 617 to extinguish the "OUT"lamp. A negative voltage through diode 621 and resistor 619 to capacitor 607 prevents re-trigger of SCR Q616. The +50V placed on the "MASTER'S CALL LINE" causes a short positive pulse through capacitor 635 to the base of transistor 639, cutting it off to extinguish any lamp that may be on at the beginning of a call. Closed contacts B of the selector switch 44 assigned to the RLD applies a negative voltage to one side of the "TALK" lamp; the other side of the talk lamp is connected to +50V from the ANN Terminal of Call Generator 800 through diode D83. Thus, the "TALK" lamp will flash so as to indicate transmission of the call to the REMOTE LOCATOR DISPLAY.

The telephone modification is shown diagramatically at 27, 28, 29 in FIG. 1 and in detail in FIG. 11. It is associated with portions of a master. The connections between the master and telephone circuit are as follows: The anode of SCR Q219 (FIG. 6) extends to an interlock switch in the coupler 27 for a telephone handset or the like. The energizing coil of relay K13 extends to contacts C of a relay K14; the contacts C and D of relay K2 extend to contacts A and B of relay K14; and the coil circuit of relay K3 extends through an amplifier to contacts A and B of relay K14. This telephone modification provides for inclusion of outside telephone parties entering into conference with conferring masters. Placement of the telephone handset 28 in its coupler 27 associated with a master closes the interlock switch 513. Conferences appearing on the "IN LINE" are then heard by the telephone party through the closed contacts C and D of relay K2 and contacts A and B of relay K14 through the closed interlock switch 513, by means of speaker S and the telephone transmitter. Microphone M or an induction pickup at the telephone handset receiver REC picks up the voice signals on the telephone receiver and the AF VOR amplifier transmits these signals to the monitor speaker at the master associated with and audible at the master's SPEAKER-MICROPHONE 40. A portion of the amplified voice voltage is rectified and connected on line 518 to the relay K14. VOR relay K14 is closed thereby and applies +50V to resistor R54 causing TLK relay K13 to operate and place the master using the telephone-coupler on the OUT LINE while other masters remain on the IN LINE. When a telephone party attempts to speak at the same time as a conference party already speaking, K3 buzzes and the voltage variation across its coil is fed to the "busy" amplifier BZ AMP connecting through closed contacts of relay K14 and closed switch 513 to speaker S and the telephone transmitter. Thus, the telephone party will hear the warning buzz.

FIG. 12 is a circuit diagram of a form of communication nulling and cancelling circuit which may be used in the blocks 9 or 9A of FIG. 3. The circuit is described as follows: Minus supply connection is permanent; +50V supply connects to it through ACT only while relay K7 or K8 is latched during a communication. While thus activated, circuit parameters chosen cause oscillator unijunction (UJT) transistor Q904 to fire at a rate of one pulse per minute when the voltage on capacitor C902 charging through resistor 901 exceeds the firing point of Q904. The resultant pulse through fine adjustment resistor 907 charges capacitor 908 to the firing point of UJT Q912 in approximately 5 minutes. The positive pulse from Q912 applied to the gate of SCR 914 causes it to trigger and forward bias transistor Q918 from which the amplified positive pulse is applied to the center tap of either transformer winding 2 or 6 (depending upon which NULL CANCEL circuit is employed) which causes its associated amplifier and connected masters to cancel to standby.

Nulling of the NULL CANCEL circuit occurs when its associated TLK K5 or K6 relay is closed by having +50V applied to its coil from a talking master; closure of the TLK relay B contacts applies minus voltage to the top of capacitor 908 through NULL which discharges it and starts its charging cycle over again.

FIG. 13 has been presented to show a typical tone generator. The oscillator shown is the well known phase shift oscillator. Resistors 805, 807, 809 and capacitors 803, 806, 808 comprise a three stage R-C phase shift network is positioned in the feedback path of the transistor.

The R-C values of the R-C network determines the oscillation frequency. When relay K55, for instance, is energized the phaseshift oscillator is energized, oscillates and the oscillation is applied across capacitor 802 to amplifier 31 or 32 input.

A more complete operational description of the new communication recorder system of this invention follows, referring to FIGS. 1 through 6 generally.

To call another master, the caller at master 21, for example, momentarily depresses the station selector switch 42 assigned to the callee. This applies +50V (the call pulse) from the CALL GENERATOR through relay K3 to the IN relay K2 of the callee which latches to place the speaker-microphone of the callee on the IN LINE (input line) connecting to the remote common amplifier 31 or 32 being secured. It also causes the caller's relay K3 to latch and place its speaker-microphone on the OUT LINE connecting to the output of the amplifier being secured. Latched relay K2 of the callee causes is master's LOCATOR PULSE GENERATOR to send a positive pulse to the available amplifier to secure it, reverse the input-output terminals and activate the TONE GENERATOR 10 (FIG. 3) briefly while a call tone is sent to the callee master. The pulse also latches the secured amplifier's associated ACT relay for the purpose of making a separate amplifier available for use by other masters. If the positive pulse from the callee's LOCATOR PULSE GENERATOR is of a proper length determined by actuation of a locator switch on the callee master's front panel, it will be "decoded" by the calling master's LOCATOR PULSE DECODER to cause illumination of a locator lamp on the master's front panel corresponding to the actuated locator switch at the callee master. If the callee master is in the non-private mode of operation, the calling person may depress his TALK switch and talk to the called person who may upon its release make a handsfree rely. If the callee master is in the private mode, the called person can nullify privacy by momentarily depressing his TALK switch. Privacy is automatically restored at the end of communication. If the called person does not nullify privacy, the caller may activate the callee master's recorder 50 by simply depressing his TALK switch; the recorder 50 will then record without noise unless the called person nullifies privacy which permits a normal intercom conversation to ensue. If privacy nullification or recorder activation does not take place, the AUTOMATIC CANCELLATION circuit at the callee master will automatically cancel both masters and return them to the standby mode.

EXPLANATION

To make a call, the caller momentarily depresses the station selector assigned to the master being called. (Assume that master 21 is making a regular call without lmp annunciation to master 22.) Closure of station selector 42 (FIG. 5) applies +50v from is contacts C to TRIG at the CALL GENERATOR 800 (and FIG. 8) causing it to place a +50v call pulse on the CALL terminal connecting on line 141 through the coil of relay K3, diode D71 (line 142) closed B contacts of selector switch 42 and the CALL LINE connecting through the interconnecting cable to the callee's OWN CALL LINE at the ANN relay K9 coil which will energize and connect OWN CALL LINE through OUT relay K3 C contacts to the IN K2 coil. Relay K2 latches because the lower end of the coil connects to minus voltage from ACT LINE 1 through relay K7 C contacts. Because the coil of the caller's relay K3 is of low resistance (400 ohms) and the coils of callee's relays K9 and K2 are of high resistance (5,000 ohms), for example, the caller's relay K3 will not energize until the callee's transistor Q52 at K2 receives +50v and minus voltage through closed contacts A and B of relay K2. The brief +50v pulse through capacitor C8 in the base of Q52 places minus voltage on OWN CALL LINE connecting back to the coil of the caller's relay K3 which permits sufficient current flow to latch it.

It will be seen now that both masters are effectively on a private line because no other master can be successfully connected into communication with them. At the called master, such as master 22, transistor Q52 loses its forward bias when capacitor C8 becomes charged and cannot conduit to energize a calling master's relay K3. At the calling master, such as master 21, the path from is OWN CALL LINE to its IN relay K2 is cut when contacts C of latched relay K3 open.

SECURING AN AMPLIFIER FOR EXCLUSIVE USE

When a call is received, contacs A of latched relay K2 connect +50v to TRIG² at the LOCATION PULSE GENERATOR 700 (see FIG. 9). If no locator switch has been actuated, a 0.1 second +50v pulse at SIG1 is applied to the coil of relay K3, while minus voltage is applied to relay K3 from the B contacts of latched K2 through diode D23. Relay K3 is energized for the length of the pulse. The 0.1 second pulse also connects through LOCATOR PULSE GENERATOR SIG2 and contacts A of relay K13, contacts B of relay K4; resistors R44, R45 contacts D and E of energized K3; E, F of energized K1, center tap of winding 1 of transformer 4 connecting to the coil of T/L relay K5 which energizes. Contacts A of relay K5 latch ACT relay K7.

When relay K7 is not energized, minus voltage is on ACT (actuate) LINE 1 from contacts C of relay K7, but not on ACT LINE 2. This insures that only K2 will be energized at the called master so that remotely located amplifier 31 will be secured. However, if amplifier 31 is already secured and relay K7 is energized, minus voltage from contacts C of latched relay K7 is applied through ACT LINE 1 to the coils of relay K2 of all masters and through ACT LINE 2 to the coils of their K1 relay. Now, if a cal is made, K1 nd K2 will latch at the called master and K1 and K3 at the calling master. +50V necessary to cause K1 to latch a momentarily obtained through capacitor C10 from the junction of diodes D28 and D29 made available from latched relay K2 in the called master and K3 in the calling master, respectively, as a result of a call. Notice that during calls, where there is no negative voltage on ACT LINE 2; upon energizing of relays K2 or K3 the negative voltage is applied to the top of the coil of K1 from the lower contacts A of either energized relay K2 or K3. This causes rapid charging of capacitor C1 from the +50v supply via resistor R26 (beneath K2). The masters, upon securing amplifier 31, thereby run no risk of having their relay K1 energized when negative voltage is immediately placed upon both ACT LINE 1 and 2 at the time amplifier 32 is made available.

VISUAL INDICATION THAT ALL AMPLIFIERS ARE IN USE

When both amplifiers are in use, contcts B of latched ACT rely K7 (FIG. 3) and contcts A of relay K8 apply +50Volts to the BUSY LINE connecting to the gates of SCR Q210 in all master stations and to one terminal of their CONF (conference) lamps. At all masters not in communication, SCR Q210 will be triggered and apply minus voltage on the return line of the CONF lamps to which +50V is applied through diode D97 from the BUSY LINE. The CONF lamps remains illuminated as long as both amplifiers 31 and 32 are in use. They will not be illuminated at masters already in communication, because SCR Q210 of the in-use masters have minus voltage applied to their gates from either contacts B of latched relay K2 or Contacts A of relay K3.

CALL TONE GENERATOR

When a locator pulse secures an amplifier, as described in "SECURING AN AMPLIFIER FOR EXCLUSIVE USE", (amplifier 31 for example) relay K7 latches and the contacts A thereof apply +50V through capacitor 5 onto the coil of tone generator relay (TG) K55 to energize it. Contacts of relay K55 supply +50V to both the tone generator (TONE GEN) and relay K5 causing it to energize for a time determined by resistor R3, capacitor C5, and the resistance of the coil of rely K55 which, in a representative embodimment, is 5000 ohms. The input-output connections to amplifier 31 are reversed for approximately 0.6 second while the output of TONE GEN, also being energized by 30 50V, is applied to the input of amplifier 31. The output of amplifier 31 is heard at the speaker-microphone of the called master. At the end of 0.6 second relay K5A deenergizes for lack of charging current through capacitor C2 and remains so for the rest of the communication. The tone generator for amplifier 32 operates in the same manner. A typical tone generator is shown in FIG. 13. Many such generators are known in the art. A typical tone generator circuit is shown in FIG. 13.

The call tone is heard at the called master immediately after its LOCATOR PULSE GENERATOR stops sending a locator pulse 0.1 to 0.4 seconds in length. During conference calling, 30 50V is applied from the BUSY LINE to charge capacitor C5 or C3. Upon conference implementation, +50V is cut and immediately reimposed on C5 or C3 dependent upon which amplifier is being secured. The residual charge on 50 microfarad C5 or C3, plus the delay caused by the charging of 5 microfarad C4 or C2, prevents actuation of relay K55 or K66.

INCOMING AND OUTGOING CALL INDICATION BY MASTER

The call lamp (FIG. 4 is illuminated at a called master when an incoming call is received. Contacts B is latched relay K 2 connect one side of the CALL lamp to minus voltage. The other lead of the CALL lamp is on +50V.

The TALK lamp is illuminated at a master making a successful call. Minus voltage to the TALK lamp comes from contacts A of latched relay K3 through contacts D of relay K11. +50V is supplied from contacts B of latched relay K3 and resistor R47 and diode D73 connecting to the top of the TALK lamp. (Further details of CALL indication by lamp appear in the descriptions of the privacy and conference features hereinafter.)

TALK SWITCH/VOR (VOICE OPERATED RELAY)FUNCTIONS

The purpose of the talk Switch 55 and VOR are:
1. During regular calls, to provide the caller with means to reverse the input-output connections to the secured amplifier.
2. During a regular call to provide for nullification of privacy by a callee whose master is in the privacy mode.
3. During regular or conference calls to provide for activation of callee's recorder by caller.
4. To provide for conference call acknowledgement.
5. To provide for conference implementation by conference caller.
6. During a conference to provide conferee with means to place his master on the opposite side of the secured amplifier from the other conferees and means to reverse the amplifier input-output connections.

At a calling master during communications with callee:

+50V is present at the movable contact of talk switch 55 from relay K2 A contacts, latched K3 B contacts, through diodes D28 and D29. This +50V also connects to the lower terminal of the coil relay of K13. Minus voltage is applied to the emitter of transistor Q166 through diode D212 from contacts A of relay K2.

Closure of talk switch 55 (FIG. 5) (or the output of VOR amplifier) places +50V on the lower terminal of the coil of relay K13 and on resistor R54 to forward bias transistor Q166. A negative voltage is placed from the collector of Q166 on the coil of relay K13 to energize it. It also places a forward bias on transistor Q163 through R57 and R55 causing it to conduct, and to place +50V on resistor R49 which cuts off the minus voltage supply to the coil of relay K4 causing it to deenergize. At resistor R49, +50V is applied to closed contacts B of K13 and through contacts B of deenergized relay K4 to the junction of resistors R44, R45, contacts D and E of energized relay K3 to the OUTLINE LINE and through E and F of relay K1 to the T/L relay of the secured amplifier causing it to energize and reverse the input-output terminals of the amplifier.

The positive voltage from transistor Q163 impressed through diode D74 and resistor R48 is in parallel with that through resistor R47 which causes the TALK lamp to illuminate to full brilliance each time a positive voltage is placed on the OUT LINE to reverse the amplifier.

HOW THE PRIVACY FEATURE FUNCTIONS

If the privacy switch 49 is "on" when a call is received, relay K4 will lose minus voltage supplied to its coil through resistor R51 from the latched relay K2 B contacts. K4 is deenergized and applies +50V from closed K2 A contacts through diode D28 and E of K11 to A contacts of deenergized K4 through diode D30, resistors R29 and R30 to the bottom of K3 coil latching it, because the top of the coil is connected to minus voltage through contacts B of closed relay K2 through diode D23. With relay K3 latched, and K4 deenergized, the speaker-microphone disconnects from the OUT LINE and the IN LINE so that communication is impossible. IN and OUT lamps will then illuminate.

NULLIFICATION OF PRIVACY

If a person receives a call when private switch 49 is "on", he can momentarily depress his TALK switch 55 and then reply remotely to his master. Nullification takes place when closed switch 55 applies +50v from A contacts of latched relay K2 through diode D28 to diodes D87 D50 and resistor R83 to the gate of SCR Q219 causing it to trigger and furnish minus voltage through diodes D91, D80 and resistor R51 to relay K4 which is energized and removes +50v from K3, which deenergizes.

Triggering SCR Q219 occurs automatically if switch 49 is "off", because +50v at contacts A of latched relay K2 is applied through diode D28, deenergized K4 A contacts, closed privacy switch 49, zener diode Z24 to the gate of SCR Q219 causing it to trigger in about 1.5 seconds. The delay is caused by the time it takes to the charge capacitor C18 through resistor R84 to the Zener voltage of Zener diode Z24. Nullification occurs when triggered SCR 219 furnishes minus voltage through resistor R51 to relay K4 which energizes and removes +50v from relay K3 which deenergizes and removes +50v from the talk lamp to extinguish it.

CALL ANNUNCIATION BY LAMP

To make an annunciator call from master 21 to master 22, depress station selector 42 for 0.5 second which applies +50v to TRIG at the CALL GENERATOR 800 to secure master 22 into communication as previously described. At the end of 0.5 second, another call pulse is sent in the same manner to energize ANN relay K9 at master 22 which removes minus voltage at contacts C of relay K9 coming from contacts of relay K11 to the gates of annunciator SCR's Q104 and Q104A. Simultaneously with that call pulse, another positive pulse is sent out from the CALL GENERATOR ANN terminal, line 139 and diode D39 to OWN LINE in master 21 connecting through the interconnecting cable to the SCR Q104 annunciator lamp pair assigned to master 21 at each master. Since the gates of all of those SCR's have minus voltage connected to them except at master 22, the SCR at master 22 will trigger to illuminate its associated lamp in the station selector assigned to master 21 to identify the caller to the person at master 22.

To summarize: In order to make an annunciator call, the CALL GENERATOR places positive call pulse on both the callee's call line causing its relay K9 to remove the minus cut-off voltage from its annunciator SCR's and out on the caller's OWN CALL line to the gates of all SCR/annunciator lamps assigned to it. The caller's annunciator lamp will illuminate at the callee master only.

Successful annunciator lamp illumination at the called master is indicated at the caller's master by a flash of the caller's TALK lamp when the called master has been secured into communication. The flash occurs when the +50V call pulse at ANN of the CALL GENERATOR connects through diode D83 to the TALK lamp. Negative voltage is applied from energized relay K3 A contacts and relay K11 contact D through diode D85 to the talk lamp.

Annunciator lamps may be extinguished by actuating the cancel switch 54 to remove the minus voltage supply from transistor Q which is in series with the annunciator SCR's Q104 and Q104A. 104A. Depressing the illuminated station selector extinguishes the lamp's +50V supply Q102 the selector C contacts. Privacy nullification will cause the lamps to be extinguished when conducting SCR Q219 applies a minus voltage pulse through capacitor C17 to monentarily cut off transistor Q102 through which the minus voltage supply to the annunciator SCR Q104 and Q104A flows. Since SCR Q219 can only send one pulse through capacitor C17 during a communication, any annunciator calls received during the communication will be held.

Selector switch 41 shows optional modification enabling automatic annunciator call by momentary closure of switch 41 in the master whose CALL line connects to that selector.

BUZZER

If a master is already in communication when a call is received, a buzz will sound instead of a call tone. A conference call is announced by a buzz instead of a call tone. In the first instance, capacitor C16 takes a positive charge either from energized K2A or K3B contacts. In the second instance, it charges from +50V on the BUSY LINE. A call energizes relay K9 and causes capacitor C16 to discharge through BUZZ.

MANUAL CANCELLATION OF STANDBY

Any person can cancel his own master and the master(s) he is communicating with, together with the amplifier into the standby mode. When the CALL-CANCEL switch 54 is depressed, +50V present at diodes D28 and D29 from either energized relays K2 or K3 connects through B contacts of closed call cancel switch 54 to resistors R17, R18, C and D contacts of relay K1 (assuming amplifier 31 is employed), transformer 15, connecting through resistor R8 to the gate of SCR Q39 which triggers and forward biases transistor Q33 from the collector of which +50V is applied to resistor R6 which cuts off minus voltage to the coil of relay K7 causing it to deenergize and place amplifier 31 back into an availability status.

At the other master's resistors R17, R18, the cancel voltage there connects through B contacts of CALL CANCEL switch 54 to resistor R33 causing SCR Q84 to trigger and send minus voltage to diodes D31, D38 and D40 connecting to relays K1, K3 and K11 respectively to cut off the +50V supply to any that are energized and causing the master to revert to standby.

At the cancelling master, after the cancel voltage is sent out, the movable contact A of CALL CANCEL switch 54 connecting to minus voltage opens from the top contact to open the minus voltage end supplying transistor Q102 and SCR131 which extinguishes the annunciator and recorder lamps. When the movable contact A of switch 54 touches the lower contact of the A contact pair negative voltage is applied to diodes D31, D38 and D40 to deenergize K1, K3, or K11 as necessary. The master reverts to standby.

AUTOMATIC CANCELLATION

If a regular call is received by a master where the private switch 49 is "on", A contacts of latched relay K2 apply +50V through resistor R32 to charge capacitor C10 to the Zener voltage of Zener diode Z90. If a person receiving the call does not nullify his privacy mode within approximately 11 seconds, the Zener voltage is reached and Zener diode Z90 goes into conduction to trigger SCR84 which causes cancellation of the master. But, simultaneously, SCR Q84 also forward biases transistor Q83. From the collector of Q33 positive voltage is applied to resistor R17, R18 to trigger the SCR Q84 of the calling master and SCR Q39 or Q39A at the remotely located amplifier assembly resulting in the cancellation of the calling master and amplifier. If the called person nullifies privacy before the Zener voltage of Z90 is reached, the minus voltage on the anode of triggered SCR Q219 is applied through resistor R38 to capacitor C10. Resistors R38 and R32 form a voltage divider. The junction at capacitor C10 cannot reach the Zener voltage of Z90 which prevents automatic cancellation.

If the recorder circuit has been actuated, automatic cancellation cannot take place, because SCR Q130 furnishes minus voltage through diode D68 and resistor R39 to capacitor C10 preventing the Zener voltage of Z90 from being reached.

Automatic cancellation during a conference will be explained when conference calling is explained.

The NULL CANCEL circuit at each amplifier will place a cancel pulse on the "IN LINE" to cancel its own amplifier and the masters employing it to standby after a predetermined length of time in which the T/L (talk-listen) relay is not energized.

The NULL CANCEL circuit is similar to the "AUTO CANCELLATION" circuit in FIG. 4 which may easily be constructed by those experienced in the art. Appropriate R-C values are required to produce a time delay in the generation of a cancel pulse determined by the requirements of the communication situation, a time preferably measured in minutes, not seconds.

As shown in FIG. 3, the NULL CANCEL circuit is activated by applying +50V to its "ACT" terminal from the energized ACT relay. A timing capacitor (similar to capacitor C10, FIG. 4) charged to a positive value, causes production of a cancel pulse by the circuit at at predetermined time. If the T/L relay is energized, contacts A thereof apply minus voltage to the timing capacitor causing it to discharge and thereby prevent cancellation. Cancel pulses are applied from "CANC" to the "IN LINE", from which the cancel pulses are applied to the cancel circuits of the amplifier and employing masters.

AUTOMATIC ACTIVATION OF A CALLED MASTER'S RECORDER

When a call is received relay K2 in the called master latches, K4 deenergizes and K3 energizes as it goes into the privacy mode. At this time, the OUT LINE connects through D and E of energized relay K3 to the junction of resistors R44, R45 through contacts B of deenergized relay K4 and B contacts of relay K13 to the gates of SCRS Q130 and Q131. If the TALK switch 55 is depressed at the calling master, +50V will be placed on the OUT LINE which connects to the gates of the callee's SCR's Q130 and Q131, causing them to trigger. SCR 131 illuminates the RECORD lamp (RCRD) until either the CALLCANCEL switch 54 or RCRD OFF switch 51 is depressed to cut the minus voltage supply.

SCR Q 130 supplies negative voltage to transistor Q 126, which in turn supplies negative voltage necessary to power the recorder. Also, when SCR Q 130 is triggered it applies negative voltage through diode D 68 to prevent automatic cancellation. It connects also through diode D 66 to capacitor C 9 to prevent self cancellation during conference calling when the recorder is activated. When the master cancels, minus voltage from previously latched relays K2 or K3 is disconnected from SCR Q 130 causing it to cut off. Depressing the RCRD OFF switch 51 will cut minus supply to SCR Q 130, also.

When the caller depresses his TALK switch 55 to speak, +50V appears on the callee's OUT LINE and at the junction of resistors R 19, R 20. (See: TALK SWITCH/VOR FUNCTIONS). From there, it is applied through diode D 102 to forward bias transistor Q 126 which applies power to the recorder and to relay K 10 to energize it. The input of the recorder is connected through contacts A of energized relay K 10 to the IN LINE which carries the amplified voice of the caller. The callee's voice will not be recorded unless he depresses his TALK switch 55 when replying, which connects +50V at switch 55 through diode D 89 to resistor R 65 at the base of transistor Q 126.

ACTIVATING ONE'S OWN RECORDER

If a callee master's RECORD switch 52 is depressed, activation of its recorder will take place in the same manner as if the caller activited it. Switch 52 receives +50V from either energized K2 or K3 and upon closure triggers SCR's Q 130 and Q 131.

Activating the recorder 50 at a calling master causes its transistor Q 126 to be forward biased continuously. Both sides of the conversation are recorded. This is because +50V on contacts A of relay K2 connects through contacts B of closed relay K 3 and diode D 61 to resistor R 65 to forward bias transistor Q 126 which furnishes minus voltage to the recorder.

When listening to the callee, relay K 10 connects the input of the recorder to the OUT LINE which carries the amplified voice of the callee.

When the caller desires to speak, he depresses his TALK switch 55 causing the input-output terminals of the amplifier to reverse themselves and it also places +50V on the OUT LINE which connects to resistor R65 to forward bias transistor Q126 and to relay K10 coil to energize it and place the input of the recorder on the IN LINE which now carries the voice of the caller.

CALLING A CONFERENCE

The following features are present during conference calling and during conference:
1. Amplifier status is "frozen" during calling only.
2. CONFER lamps illuminate at caller's master and those masters not engaged in communication during calling only.
3. Non-conferring masters prevented from making calls during calling only.
4. Cut-off bias removed from annunciator SCR's at all masters called for conference during calling only.
5. Automatic cancellation of annunciator lights upon conference implementation.
6. Automatic illumination of annunciator lamps during calling and conference acknowledgement.
7. Successful calls indicated by flash of caller's TALK lamp during calling. Illumination of callee's CALL-CANCEL lamp accompanied by an audible buzz or tone announces call.
8. Automatic cancellation of caller's and called masters if conference not implemented in (approximately) 11 seconds.
9. Conference implementation by means of caller's CONFER switch causes non-acknowledging masters to self-cancel.
10. Implementation by means of TALK switch causes non-acknowledging master's (or masters') recorder(s) to activate.
11. Anti-interrupt means allows only one conferee to speak at a time.

Momentary closure of conference switch 53 latches relay K11 by placing minus voltage present on its A contacts from BUSY LINE 106, originating at either K7 or K8 B contacts onto the coil of K11; the other end of coil of K11 connects to +50present at K3 B contacts. Now, +50V at relay K2 A contacts connect through closed K11 B and C contacts to BUSY LINE which connects through the interconnecting cable to NULL at the CALL GENERATOR of all masters except the caller to prevent their making calls. +50V on the BUSY LINE 106 also connects to the junction of R6 and/or R13 and relay K7 and/or K8 depending on whether one or both are deenergized. This provides that +50V will be connected to the lower end of a deenergized ACT relay (K7 or K8) coil which prevents the coil from energizing when a locator pulse is transmitted by a master during conference calling. +50V on BUSY LINE 106 connects to the bases of transistors Q33 and Q33A to prevent either SCR Q32 or Q32A from forward biasing the transistors and causing the deenergizing of either of the ACT relays K7 or K8 if energized in the event that a cancel pulse is received at the end of a communication in progress by either SCR Q39 or Q39A during conference calling.

Closed A contacts of relay K11 apply minus voltage to the collector of transistor Q102 via line 121 to prevent annunicator lamp extinction before conference implementation by a minus voltage pulse through capacitor C17 from SCR Q219 triggered by conference acknowledgement; A contacts of relay K11 also remove minus voltage (cut-off bias) from C contacts of K9 so that any conference acknowledgements will automatically illuminate the appropriate annunciator lights; A contacts of K11 (energized) also place minus voltage through diode D81 on K4 coil; they furnish minus voltage to K11 coil while calling progresses.

Closed contacts B on K11 apply +50V from A contacts of K2 to diode D52 connecting to resistor R32 to provide for automatic cancellation in approximately 11 seconds if the conference is not implemented; +50V through diode D55 keeps its junction with diode D89A at +50V potential so that negative voltage from relay K2B contacts connecting to resistor R38 will not prevent Zener voltage attainment at the capacitor C10 resistor R32 junction.

Successful conference calls are indicated by a flash of the TALK lamp when part of the call pulse and all of it on subsequent calls goes through the TALK lamp. The caller's closed D contacts on relay K11 connect one side of the TALK lamp to B contact of the station selector switch 42, which connect to a caller's CALL LINE when the desired selector is depressed. A successful first call (refer to how a regular call is made) causes the callee's transistor Q52 to place a minus voltage briefly on its OWN CALL LINE and also to latch relay K11 whose coil is connected to +50V on the BUSY LINE 106.

The closed B contacts on calling master's latched relay K3 applies +50V through diodes D24 and D29 through E contacts of closed relay K11 to the other side of the TALK lamp, which will flash. Each subsequent call makes it flash as the call voltage completely bypasses the K3 coil and goes through the TALK lamp.

Calling master's B contacts of K3 apply +50V through B contacts on relay K11 and diode D48 to its OWN CALL LINE, connecting to its annunciator lamp/SCR pair at the other masters. Since minus voltage connecting from a master's annunciator SCR Q104 and Q104A gates to A contacts on closed relay K11 is cut at all masters called for conference, the caller's annunciator lamp will annunciate there.

Upon call reception, E contacts of closed relay K11 apply +50V at the A contacts of callee's latched relay K2 through diodes D28 and D24 and resistor R30 to the coil of relay K3 causing it to latch after a slight delay caused by the charging of capacitor C12. The purpose of the delay is to prevent cutting off the OWN CALL LINE at C contacts of relay K3 too quickly upon call reception. The callee's CALL lamp will now be illuminated as will be his CONF lamp.

The speaker-microphone 40 will be cut off from the amplifier upon reception of a conference call when relay K3 latches. A buzz announcing the call, instead of a call tone, will sound when K9 contacts briefly connect capacitor C16 across the buzzer BUZZ.

Automatic cancellation is prevented during conference calling at a callee by the connection of minus voltage at the A contacts of closed relay K11 through resistor R40 to the junction of resistor R32 and capacitor C10.

A callee acknowledges readiness for conference by momentarily depressing his TALK switch. Closure connects +50V at A contacts of closed relay K2 through diode D28, TALK switch 55, diode D89 and closed B contacts of relay K11 to diode D48 connecting to OWN CALL LINE terminating at its annunciator SCR at all masters resulting in annunciator lamp illumination at the caller's those and called after him, but already illuminated at those called before. The +50V at the TALK switch 55 also goes through diode D87 and resistor R83 to trigger SCR Q219 which serves to keep relay R4 energized during the conference and prevent automatic cancellation of master.

The caller may cause conference implementation by depressing his CONFER switch 53 which connects minus voltage from closed contacts A of latched relay K3 through closed CONFER switch 53 contacts A to the junction of resistor R64 and relay K11 coil which cuts off its +50V supply and causes relay K11 to deenergize. Capacitor C11, which has taken a charge from K2A contacts throgh the CALL light, discharges through diode D37 and relay K2 coil to latch it. +50V is disconnected from the BUSY LINE at K11 contacts C and BUSY LINE reconnects to NULL at the CALL GENERATOR. Opened K11A contacts place minus voltage back on the annunciator SCR gates and on capacitor C15 to momentarily cut off transistor Q102 furnishing power to the annunciator SCR's, which cut off, along with the annunciator lights. SCR219 is triggered by the charge on capacitor C11 connecting through diode D50 to its gate.

If conference implementation is by means of the CONFER switch, a non-acknowledging master will self-cancel after a delay of approximately 0.1 second. (The delay is to accomodate recorder activation by caller when desired, to be described later.) Automatic cancellation as previously described, caused by the triggering of SCR84 through Zener diode Z90, occurs too slowly, so it is done as follows: During conference calling, capacitor C13 charges through conductor Y connecting to +50V on the BUSY LINE at closed relay K11C contacts. Upon conference implementation, K11 will deenergize as will K4, which connects capacitor C13 through conductor X to resistor R31. It will take approximately 0.1 second to charge capacitor C9 to where it will trigger SCR84 resulting in cancelling of the master, but not the other conferring masters because minus voltage from SCR Q210 connecting to resistor R36 prevents transmission of a positive pulse to the IN LINE.

The conference will be implemented if the caller momentarily depresses his TALK switch 55, which connects +50V from closed K3B contacts to resistor R54 causing transistor Q166, which receives minus voltage to its emitter from SCR Q210, to conduct and energize K13, whose closed C contacts connect +50V present on contacts B of closed relay K3, which connects to the coil of relay K11. This cuts off its minus voltage supply causing it to deenergize and remove +50V from the BUSY LINE at C contacts. The caller and acknowledging masters revert to the conference mode as previously described.

Momentary closure of the TALK switch not only causes conference implementation, but it also places ±50V from the collector of transistor Q163 through diode D75 and closed B contacts of energized relays K4 and K13 to the OUT LINE. A non-acknowledging master will go into the privacy mode becuase K4 has lost its source of negative voltage to its coil through diode D81 from A contacts of relay K11 when it deenergized. Because the master is in the privacy mode, its recorder activation circuit connects to the OUT LINE which results in its activation. (See: AUTOMATIC RECODER ACTIVATION.) Triggered SCR Q130 will furnish a nullifying voltage through diodes D66 and D68 to prevent automatic cancellation.

The annunciator lamps of conferee masters are automatically extinguished upon conference implementation when A contacts of deenergized relay K11 apply minus voltage to capacitor C15 which causes transistor Q102 to cut off momentarily along with the annunciator SCR's Q104 and Q104A.

Upon conference implementation, all acknowledging conferee masters revert to a listen mode wherein Conference Masters' relay K2 is energized which connects their speaker-microphones to the IN LINE connecting to Amplifier 31 through K1, which, if energized, connects it to Amplifier 32. Because all masters are on the amplifier's input, nothing is heard until a conferee depresses his TALK switch 55 which results in the energizing of his relays masters K13 and K3 and the deenergizing of K4. This results in the placement of the speaker-microphone on the OUT LINE and reversal of the input-output connections at the amplifier.

Lamp indications at the masters at this time are: The CONFER and the CALL-CANCEL lights are illuminated at the listening conferee masters, except for the one(s) recording it, where it will also have its RECORD and TALK lamps illuminated.

The anti-interrupt feature provides that no one will be able to break in on an existing voice transmission. If a person depresses his TALK switch 55 at this time, his relay K13 will be energized, as will his K3. The instant K3 is energized, it applies +50V on the OUT LINE from the transmitting master through contacts D and E of energized relay K3, contacts B of energized relay K4 and contacts A of energized relay K13 to the junction of resistors R55 and R57 placing the base of transistor Q166 at cut-off; K3 will deenergize for lack of minus voltage from Q166, which removed +50V from the resistor R55, R57 junction, resulting in Q166 being able to conduct again and cause K3 to energize, etc., at a rapid rate causing an audible buzz to RB sound as a warning to the master's owner. The speaker-microphone 40 is completely disconnected from the amplifier when D contacts of energized K13 connect it to C contacts of energized relay K4.R.B.

SECURING AN AMPLIFIER FOR CONFERENCE:

+50V is placed on the BUSY LINE 106 by a master making conference calls. The +50V is applied to the bases of transistors Q33 and Q33A to hold them at cutoff so that, if during calling, cancellation is made by masters already in communication,, the triggered SCR (Q39 or Q39A) will remain ineffectively "on" until +50V is removed from the BUSY LINE and the conference masters have secured an amplifier. Then, the SCR, after a delay caused by having to charge the capacitor (C6 or C7) in its anode circuit, will forward bias its associated transistor which causes the ACT relay to which it is connected to deenergize.

The TONE GENERATOR does not sound to indicate a conference call because when +50V is placed on the BUSY LINE 106 by the conference caller, it charges 50 mfd capacitor C5 causing the energizing of K55 which deenergizes befoe a call can be made. The purpose of 5 mfd capacitor C4 across K55 is to provide a brief delay before the charging of capacitor C5 causes K55 to energize. +50 is applied to C5, 50 mfd capacitor from BUSY LINE during conference calling. This provides that when +50V is removed from the OUT LINE upon conference implementation and replaced by +50V at the A contacts of energized ACT relay K7 that K55 will not be energized during this changeover and cause tone generation. Similar logic applies if amplifier 32 being secured.

The available amplifier is secured (see SECURING AN AMPLIFIER FOR EXCLUSIVE USE) when it receives a positive locator pulse from the conference calling master's LOCATOR PULSE GENERATOR initiated when relay K11 is deenergized upon conference implementation resulting in the connection of +50V to TRIG2 inside the generator (see Fig. 7). The delay allows time for a non-acknowledging master's recorder to activate in the 0.1 second delay period before the master self-cancels in the absence of recorder activation.

There has been described hereinabove a new intercommunication system which includes many new features heretofore not found in such intercommunication systems. These features provide automatic functions heretofore performed by manual switching in prior art machines, the widespread use of semiconductor switching devices so that call signals and switching signals may be effectively directed to the desired circuits.

These and other features are defined in the claims which should be construed as exemplary rather than limiting in that those skilled in the art may devise other forms within the ambit of the claims in light of the teachings herein.

What is claimed as new and desired to be secured by Letters Patent of the United States is:

1. An intercom system with a plurality of master stations which can be selectively operated to intercommunicate with one another, each station containing call generating means, station selecting means, a LINE, AUTO, IN, OUT and TLK relays, a common call line from each station to each of the other stations, a call enabling transistor and speaker-microphone means, and a talk switch;

plural common amplifier means each associated with a separate talk-listen relay and a separate ACT relay;

each call generating means comprising a pair of transistors in a monostable multivibrator configuration receiving a trigger voltage from an SCR connecting to a trigger source in the associated station selecting means, said multivibrator forward biasing a transistor which places an inhibiting voltage on a line which connects to the call generators of all other stations, said multivibrator also placing a call voltage through its associated OUT relay coil and station selecting means onto the call line connecting to the called station's ANN relay coil of the called stations IN relay, said IN relay latching in the instance where the other end of the said IN relay coil connects to a call enabling voltage present on contacts of the ACT relay associated with one of said comnion amplifier means, upon latching of said IN relay an associated call enabling transistor is forward biased by its connection to said IN relay contacts, wherein said transistor's collector connects to said call line to provide a low resistance termination for said call voltage enabling the caller's OUT relay to latch;

during a call, one of said amplifier means has an input and output connecting respectively to the speaker-microphones of the called and calling stations by contact means of their LINE, IN, OUT and TLK relays, said amplifier means having a talk-listen relay for the purpose of reversing said input and output connections and connecting for its actuation by voice line means to the talk switch of the calling station, each amplifier means having an ACT relay for the purpose of providing for proper amplifier availability.

2. In the intercom system defined in claim 1, auto cancellation means and manual cancellation means comprising:

an integrated combination of three separate auto cancellation circuits, said combination having means to selectively time-delay and selectively inhibit the automatic cancellation of a call, said combination comprising:

in each station a first separate auto cancellation circuit comprising an SCR-transistor pair, said SCR triggerable by its connection to and reception of a cancellation pulse by said voice line means and triggerable also by its connection by means of an inhibitible time-delay circuit to contacts of its associated IN relay, said SCR being connected by its anode to the coils of its associated IN and OUT relays and able to deenergize them by interrupting their supply voltage, said transistor, by connection of its collector to said voice line means, upon being forward biased by said SCR, is able to cause cancellation to standby of any station connected in communication with said transistor's associated station;

a second separate auto cancellation circuit connecting to each amplifier's ACT relay comprising an SCR-transistor pair, the SCR, upon receiving a cancellation pulse by said voice line means from the aforesaid first cancellation circuit, triggering, and by its connection to its connection associated transistor, forward biasing said transistor whose collector connects to and deenergizes the coil of the associated ACT relay, thus placing the associated amplifier in standby;

connecting to each amplifier means, a third auto cancellation circuit with a timing cycle comprising a cancellation pulse generator which activates upon receiving a supply voltage from the associated amplifier means' ACT relay contacts, and, after a predetermined length of time, places a cancellation pulse on said voice line means connecting to the ACT relay's associated second cancellation means and to the first cancellation means of the stations employing said ACT relay's amplifier means in a call, placing the said stations and amplifier in standby unless the third cancellation means has been reset by a nulling voltage connecting to it from the contacts of its associated talk-listen relay, said nulling voltage being produced only when said talk-listen relay is energized before the end of the time cycle of the said third cancellation circuit;

and manual cancellation means in each station connecting to the coils of its IN and OUT relays, said manual cancellation means manually operable to connect a cancellation voltage to said IN and OUT relay coils and to connect, by said voice line means, a cancellation voltage to the first auto cancellation circuit of any other station that is connected in a call with its associated station and to the second cancellation circuit of their employed amplifier means.

3. In the system defined in claim 1, a call annunciator means in each station comprising:

means to indicate to a called party which of the other stations in placing a call, a plurality of SCR controlled annunciator lamp means, each one associated with a common call line from one of the other stations, a source of negative cut-off voltage, which is connected to the gate of each said SCR through a contact of the associated ANN relay, said relay being energized by a call pulse received over the callee's call line to remove the cut-off voltage and enable the SCR controlled lamp associated with the calling party to be illuminated by a call pulse received over the called party's call line, which connects to the gate of said associated SCR.

4. In the system defined in claim 1, a locator means comprising:

a plurality of SCR controlled locator lamp means in each station and each lamp means associated with time-delay means in each station and each lamp means associated with time-delay means which responds selectively to locator pulses received via said voice line means, each conducting SCR connecting by capacitive means to and able to cut off selected SCR's previously triggered into conduction;

a remote locator display comprising a plurality of SCR controlled locator lamp means each one associated with a time-delay circuit which responds selectively to locator pulses received by means of a pair of directly connected transistors connecting to a caller's call line and to the remote locator display's own call line, each SCR connecting by capacitive means to and able to cut off selected SCR's previously triggered into conduction, a locator pulse connecting by capacitive means to the base of a transistor which supplies power to the locator lamps, said locator pulse able to cut off and transistor thereby causing said locator lamps to extinguish;

and a locator pulse generator comprising two transistors connecting in a monostable multivibrator configuration triggerable by transistor means connected by manual switching means in each station to that station's call generator, the output of said multivibrator connecting by manual switching and call line means to said remote locator display, said multivibrator also being triggered by an SCR connected to the IN relay contacts of its associated station when called, the output of said multivibrator connecting by said voice line means to the talk-listen relay associated with one of said amplifiers to enable its employment by causing its ACT relay to latch, said multivibrator output also connecting by said voice line means to the locator lamp means in the calling station, the width of each locator pulse identifiable with the information being transmitted as determined by manually switchable components within said generator.

5. An intercom system with a plurality of master stations which can be selectively operated to intercommunicate with one another, each station containing call generating means, station selecting means, an AUTO, IN, OUT and TLK relays, a common call line from each station to each of the other stations, a call enabling transistor and speaker-microphone means, and a talk switch;

a single common amplifier means associated with a talk-listen relay and an ACT relay;

each call generating means comprising a pair of transistors in a monostable multivibrator configuration receiving a trigger voltage from an SCR connecting to a trigger source in the associated station selecting means, said multivibrator forward biasing a transistor which places an inhibiting voltage on a line which connects to the call generators of all other stations, said multivibrator also placing a call voltage through its associated OUT relay coil and station selecting means onto the call line connecting to the called station's ANN relay coil of the called stations IN relay, said IN relay latching in the instance where the other end of the said IN relay coil connects to a call enabling voltage present on contacts of the ACT relay associated with said common amplifier means, upon latching of said IN relay an associated call enabling transistor is forward biased by its connection to the IN relay, wherein said transistor's collector connects to said call line to provide a low resistance termination for said call voltage enabling the caller's OUT relay to latch;

during a call, said amplifier means has an input and output connecting respectively to the speaker-microphones of the called and calling stations by contact means of their IN, OUT and TLK relays, said amplifier means having a talk-listen relay for the purpose of reversing said input and output connections and connecting for its actuation by voice line means to the talk switch of the calling station, said amplifier means having an ACT relay for the purpose of providing for proper amplifier availability.

6. In the intercom system defined in claim 5, auto cancellation means and manual cancellation means comprising:

an integrated combination of three separate auto cancellation circuits, said combination having means to selectively time-delay and selectively inhibit the automatic cancellation of a call, said combination comprising:

in each station a first separate auto cancellation circuit comprising an SCR-transistor pair, said SCR triggerable by its connection to and reception of a cancellation pulse by said voice line means and triggerable also by its connection by means of an inhibitible time-delay circuit to contacts of its associated IN relay, said SCR being connected by its anode to the coils of its associated IN and OUT relays and able to deenergize them by interrupting their supply voltage, said transistor, by connection of its collector to said voice line means, upon being forward biased by said SCR, is able to cause cancellation to standby of any station connected in communication with said transistor's associated station;

a second separate auto cancellation circuit connecting to said amplifier's ACT relay comprising an SCR-transistor pair, the SCR, upon receiving a cancellation pulse by said voice line means from the aforesaid first cancellation circuit, triggering, and by its connection to its associated transistor, forward biasing said transistor whose collector connects to and deenergizes the coil of the associated ACT relay, thus placing the associated amplifier in standby;

connecting to said amplifier means, a third auto cancellation circuit with a timing cycle comprising a cancellation pulse generator which activates upon receiving a supply voltage from the associated amplifier means' ACT relay contacts, and, after a predetermined length of time, places a cancellation pulse on said voice line means connecting to the ACT relay's associated second cancellation means and to the first cancellation means of the stations employing said ACT relay's amplifier means in a call, placing the said stations and amplifier in standby unless the third cancellation means has been reset by nulling voltage connecting to it from the contacts of its associated talk-listen relay, said nulling voltage being produced only when said talk-listen relay is energized before the end of the time cycle of said third cancellation circuit;

and manual cancellation means in each station connecting to the coils of its IN and OUT relays, said manual cancellation means manually operable to connect a cancellation voltage to said IN and OUT relay coils and to connect, by said voice line means, a cancellation voltage to the first auto cancellation circuit of any other station that is connected in a call with its associated station and to the second cancellation circuit of their employed amplifier means.

7. In the system defined in claim 5, a call annunciator means in each station comprising:

means to indicate to a called party which of the other stations is placing a call, a plurality of SCR controlled annunciator lamp means, each one associated with a common call line from one of the other stations, a source of negative cut-off voltage, which is connected to the gate of each said SCR through a contact of the associated ANN relay, said relay being energized by a call pulse received over the callee's call line to remove the cut-off voltage and enable the SCR controlled lamp associated with the calling party to be illuminated by a call pulse received over the called party's call line, which connects to the gate of said associated SCR.

8. In the system defined in claim 5, a locator means comprising:

a plurality of SCR controlled locator lamp means in each station and each lamp means associated with time-delay means in each station and each lamp means associated with time-delay means which responds selectively to locator pulses received via said voice line means, each conducting SCR connecting by capacitive means to and able to cut off selected SCR's previously triggered into conduction;

a remote locator display comprising a plurality of SCR controlled locator lamp means each one associated with a time-delay circuit which responds selectively to locator pulses received by means of a pair of directly connected transistors connecting to a caller's call line and to the remote locator display's own call line, each SCR connecting by capacitive means to and able to cut off selected SCR's previously triggered into conduction, a locator pulse connecting by capacitive means to the base of a transistor which supplies power to the locator lamps, said locator pulse able to cut off said transistor thereby causing said locator lamps to extinguish;

and a locator pulse generator comprising two transistors connecting in a monostable multivibrator configuration triggerable by transistor means connected by manual switching means in each station to that station' call generator, the output of said multivibrator connecting by manual switching and call line means to said remote locator display, said multivibrator also being triggered by an SCR connected to the IN relay contacts of its associated station when called, the output of said multivibrator connecting by said voice line means to the talk-listen relay associated with one of said amplifiers to enable its employment by causing its ACT relay to latch, said multivibrator output also connecting by said voice line means to the locator lamp means in the calling station, the width of each locator pulse identifiable with the information being transmitted as determined by manually switchable components within said generator.

* * * * *